(12) United States Patent
Daniels

(10) Patent No.: US 6,614,127 B1
(45) Date of Patent: Sep. 2, 2003

(54) COMBINED HEADLIGHT/WIPER SWITCH

(76) Inventor: A. Barron Daniels, P.O. Box 3441, Petersburg, VA (US) 23805

( * ) Notice: Subject to any disclaimer, the term of this patent is extended or adjusted under 35 U.S.C. 154(b) by 0 days.

(21) Appl. No.: 09/547,805

(22) Filed: Apr. 11, 2000

(51) Int. Cl.[7] .................................................. B60L 1/00
(52) U.S. Cl. ........................ 307/10.1; 307/9.1; 307/10.8
(58) Field of Search ................................ 307/9.1, 10.1, 307/10.8; 200/61.27, 61.54

(56) References Cited

U.S. PATENT DOCUMENTS

| | | | |
|---|---|---|---|
| 3,500,119 A | 3/1970 | Price | 315/82 |
| 3,500,120 A | 3/1970 | Schultz | 315/82 |
| 3,519,837 A | 7/1970 | Nolin | 307/10 |
| 3,591,845 A | 7/1971 | Vanderpoel | 307/10 |
| 3,600,596 A | 8/1971 | Aloisantoni | 307/10 |
| 3,767,966 A | 10/1973 | Bell | 315/83 |
| 3,824,405 A | 7/1974 | Glaze | 307/10 |
| 3,909,619 A | 9/1975 | Kniesly | 307/10 |
| 4,009,363 A * | 2/1977 | Binegar | 200/336 |
| 4,010,380 A * | 3/1977 | Bailer et al. | 307/10 LS |
| 4,015,137 A | 3/1977 | Kniesly | 307/10 |
| 4,057,742 A | 11/1977 | Binegar | 307/10 |
| 4,097,839 A | 6/1978 | Lesiak | 340/52 |
| 4,139,801 A | 2/1979 | Linares | 315/83 |
| 4,236,099 A | 11/1980 | Rosenblum | 315/83 |
| 4,337,400 A | 6/1982 | Hahn | 307/10 |
| 4,656,363 A | 4/1987 | Carter | 307/10 |
| 4,723,057 A * | 2/1988 | Lane, Jr. | 200/61.27 |
| 4,956,562 A | 9/1990 | Benedict et al. | 307/10.8 |
| 4,985,660 A | 1/1991 | Cronk | 315/82 |
| 5,051,873 A | 9/1991 | Ruter | 362/61 |
| 5,130,905 A | 7/1992 | Ruter | 362/61 |
| 5,136,209 A | 8/1992 | Benedict et al. | 315/80 |
| 5,138,183 A | 8/1992 | Patterson | 307/10.8 |
| 5,168,196 A | 12/1992 | Briggette et al. | 315/82 |
| 5,170,097 A | 12/1992 | Montemurro | 315/83 |
| 5,185,558 A | 2/1993 | Benedict | 315/80 |
| 5,187,383 A | 2/1993 | Taccetta | 307/10.8 |
| 5,205,634 A | 4/1993 | Ruter | 362/61 |
| 5,235,250 A | 8/1993 | Cronk | 315/82 |
| 5,250,850 A | 10/1993 | Pace | 307/10.8 |
| 5,374,852 A | 12/1994 | Parkes | 307/10.8 |
| 5,444,307 A | 8/1995 | Sheets | 307/10.8 |
| 5,449,974 A | 9/1995 | Dunbar | 315/82 |
| 5,631,500 A | 5/1997 | Whitman | 307/10.1 |

FOREIGN PATENT DOCUMENTS

DE        2730298        5/1977

* cited by examiner

*Primary Examiner*—Brian Sircus
*Assistant Examiner*—Robert L DeBeradinis

(57) ABSTRACT

A combined headlight and windshield wiper control switch for a vehicle that activates the parking lights, headlights and windshield wipers. The switch turns on the parking lights and headlights followed by the various windshield wiper settings. When turning the switch off, the switch uses different actuator movement or a locking mechanism to prevent the parking lights and headlights from being turned off when the windshield wipers are being turned off. The first embodiment uses a locking mechanism in the actuator to prevent the actuator from turning past the parking lights and headlights position. The actuator has a release button on the side that must be pressed to allow the actuator to turn to the off position. In the center of the actuator is another button that enables/disables the lighting circuit and the locking mechanism from the switch. The second embodiment has a outer actuator that turns on the windshield wipers and a inner actuator that turns on the parking lights, headlights, and windshield wipers. The inner actuator can engage the outer actuator, which allows the inner actuator to turn the outer actuator to the various windshield wiper settings. When the inner actuator is used to turn on the parking lights, headlights, and windshield wipers, the switch can be turned off in two ways. The inner actuator can be used to turn off the parking lights, headlights and windshield wipers in reverse order or the outer actuator can be used to turn off the windshield wipers and the inner actuator used to turn off the parking lights and headlights. The third embodiment consists of a single actuator. The actuator is pulled to turn on the parking lights and headlights, and is turned to turn on the various windshield wiper settings.

13 Claims, 23 Drawing Sheets

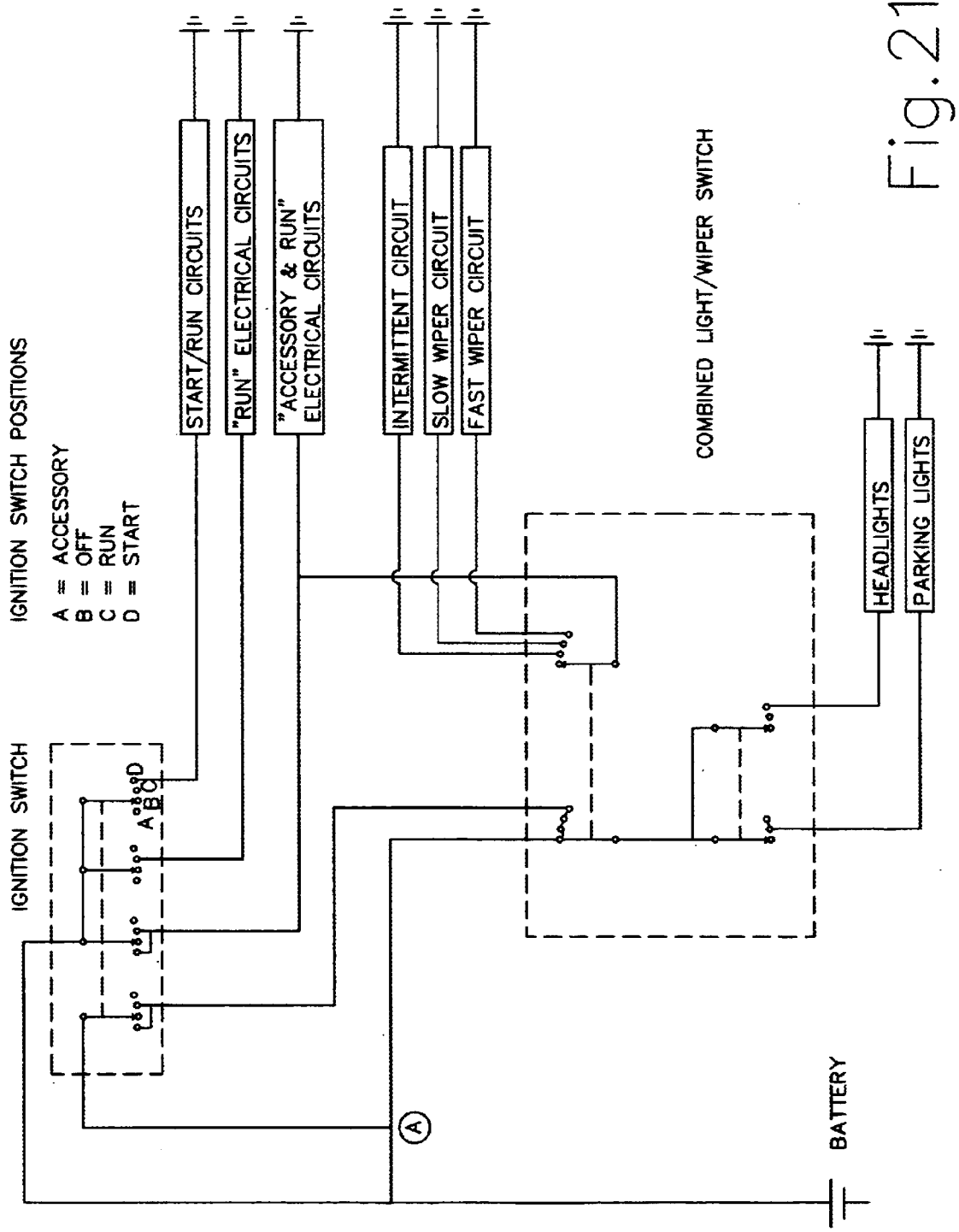

COMBINED HEADLIGHT/WIPER SWITCH

FIELD OF THE INVENTION

This invention relates to the electrical system of a vehicle, specifically to the windshield wiper and headlight control switches.

1. Background of the Invention

Traditionally, the lighting and windshield wiper electrical systems functioned independently of each other. Two separate switches controlled the lighting and windshield wiper functions. However, these two functions under many conditions need to operate concurrently. For example, while operating a vehicle during the daytime in inclement weather the windshield wipers would be turned on and it would also be a good ideal to have the parking lights and headlights on as well. This helps to increase driver visibility and also increases vehicle visibility for other drivers and pedestrians. In many states the law requires that when the vehicle is in operation and the windshield wipers are in use, the headlights must also be turned on. However, at certain times the windshield wiper and lighting functions need to operate independent of each other. For example, if it started raining at a drive-in theater or at a police stakeout, the windshield wipers would be needed without the parking lights or headlights being turned on. Even though vehicle safety is increased by turning on the headlights along with the windshield wipers while driving in inclement weather and there are laws requiring it, most people are still not in the habit of turning on the headlights when they turn on the windshield wipers. Two reasons are, because it is not convenient to turn on and off two separate switches, and for fear of leaving the headlights on afterwards. When the headlights are turned on during the daytime the driver must remember to turn them off afterwards. Since it is often difficult to determine if the lights are on or off, the driver can easily forget to turn the lights off; which if not detected in time will result in a dead battery. This is why most drivers do not turn on the headlights in inclement weather during the daytime unless they absolutely need to.

What is needed is a switch that can: 1) conveniently and safely turn on both the parking lights, headlights, and windshield wipers; 2) conveniently and safely be able to turn off the windshield wipers while leaving the headlights on; 3) be able to turn on the windshield wipers only; 4) be able to turn off the parking lights, headlights and windshield wipers when the ignition switch is turned off; 5) be able to turn on the parking and headlights at all times even with the ignition switch off.

2. Description of Prior Art

There are several patents that combine the lighting and windshield wiper functions, the inventions either use the windshield wiper switch to activate the headlights, or they have the windshield wiper circuit wired through the light switch such that the lights must be activated before the windshield wipers can be activated.

The inventions that use the windshield wiper switch to activate the lighting system incorporate the concurrent control of two circuits. In the following inventions, the lighting system is turned on at the same time the windshield wipers are turned on. In these inventions, the windshield wiper switch controls both the windshield wiper and lighting circuits. In order to achieve this, many inventions incorporate components such as relays and switching transistors into the lighting circuit. The following U.S. Patents use such components: U.S. Pat. No. 3,500,119 to Price; U.S. Pat. No. 3,519,837 to Nolin and Lidinsky; U.S. Pat. No. 3,591,845 to Vanderpoel and Broad; U.S. Pat. No. 3,600,596 to Aloisantoni; U.S. Pat. No. 3,767,966 to Bell; U.S. Pat. No. 3,824, 405 to Glaze; U.S. Pat. No. 3,909,619 to Kniesly, Colville, and Mullen; U.S. Pat. No. 4,015,137 to Kniesly, Colville, and Mullen; U.S. Pat. No. 4,097,839 to Lesiak; U.S. Pat. No. 4,139,801 to Linares; U.S. Pat. No. 4,236,099 to Rosenblum; U.S. Pat. No. 4,337,400 to Hahn; U.S. Pat. No. 4,656,363 to Carter and Isley; U.S. Pat. No. 4,956,562 to Benedick and Stumpf, U.S. Pat. No. 4,985,660 to Cronk; U.S. Pat. No. 5,136,209 to Benedick and Stumpt; U.S. Pat. No. 5,138,183 to Patterson; U.S. Pat. No. 5,168,196 to Briggette; U.S. Pat. No. 5,170,097 to Montemurro; U.S. Pat. No. 5,185,558 to Benedick and Stumpt; U.S. Pat. No. 5,187,383 to Taccetta and Fico; U.S. Pat. No. 5,235,250 to Cronk; U.S. Pat. No. 5,250,850 to Pace, Neuhaus, and Lipman; U.S. Pat. No. 5,374,852 to Parkes; U.S. Pat. No. 5,444,307 to Sheets and Parks; U.S. Pat. No. 5,449,974 to Dunbar; U.S. Pat. No. 5,631,500 to Whitman et al. If one of these components malfunctioned this would cause the lighting system to fail. Since the vehicle lighting system is of great importance particularly where road safety is concerned, a malfunction of one of these components while operating the vehicle at night and at high speeds, could result in a serious or even fatal accident. U.S. Pat. No. 4,057,742 to Binegar connects the windshield wiper switch to the lighting circuit directly, however once the windshield wiper switch is turned off the lights will also be turned off as well. When the windshield wipers and lights are turned on at the same time, as in the previous inventions, this creates the problem of keeping the lights on at night after the windshield wipers are turned off. These inventions again must use relays, warning lights, or photo-sensors in order to prevent the lights from inadvertently being turned off once the windshield wipers are turned off. These added components to the lighting system increases cost and the chance of a malfunction which could compromise road safety and present liability problems for the manufacturer. U.S. Pat. No. 5,205,634 to Ruter manually turns on the lights when the windshield wipers are turned on. Ruter's invention does not allow a windshield wiper only position and requires two windshield wiper switches, one to turn on the lights and windshield wipers and a second to adjust wiper speeds.

Other inventions have the windshield wiper circuit wired through the headlight switch which requires the headlight switch to be turned on before the windshield wipers will operate: These inventions turn on the headlights and windshield wipers in sequence, and uses a separate switch to control the various windshield wiper settings. U.S. Pat. No. 3,500,120 to Schultz; U.S. Pat. Nos. 5,051,873 and 5,130, 905 to Ruter. U.S. Pat. No. 4,010,380 to Bailer and Makdad use a third position on the headlight switch to supply the current to a separate wiper speed control switch. These inventions do not allow independent operation of the headlights and windshield wipers, and are not any more convenient to use because the operator would still have to turn on or adjust two separate switches. These inventions only force the operator to turn on the headlights first. These inventions also do not provide a single switch that could operate both the lighting and multiple windshield wiper functions. If the lighting and windshield wiper functions were in a continuous sequence, problems would arise on how to distinguish between the two functions and prevent the operator from inadvertently turning off the headlights when the windshield wipers are being turned off. The intermittent and off positions of the windshield wipers can be difficult to tell apart and on many of the windshield wiper switches the intermittent positions consists of 4 or 5 settings followed by the slow and fast positions. It could be difficult to determine where the windshield wiper settings end and where the headlight setting begins with so many positions. Also, it would be difficult to distinguish between the headlight and windshield wiper settings if the bulb that illuminates the positions of the switch burned out or if the switch was mounted on the steering column and the operator could not actually look at the switch. Hence, one could accidentally turn off the headlights when turning off the windshield wipers which would be undesirable and again could compromise road safety.

OBJECTS AND ADVANTAGES

Accordingly, besides the objects and advantages of the combined light and wiper switches described in my above patent, several objects and advantages of the present invention are:

(a) to provide a switch that turns on both lights and windshield wipers;

(b) to provide a switch that does not use relays, switching transistors or other similar components;

(c) to provide a switch that can not inadvertently turn the lights off when the windshield wipers are turned off;

(d) to provide a switch that can operate the lights only, windshield wipers only, or both lights and wipers;

(e) to provide a switch that can operate the lights directly from the battery, while operating the lights and windshield wiper through the ignition switch;

(f) to provide a switch that will not keep the lights and wipers on when the ignition switch is turned off, hence preventing the lights from being accidentally left on;

(g) to provide a single selector switch that has multiple positions and is easy and convenient to operate.

Further objects and advantages will become apparent from a consideration of the ensuing description and drawings.

BRIEF DESCRIPTION OF THE DRAWINGS

Other objects and advantages will be apparent from the accompanying drawings in which:

FIG. 11b is a partly enlarged view of FIG. 11a;

FIG. 14b is a partly enlarged view of FIG. 14a;

FIG. 21 is a circuit diagram for the third embodiment.

SUMMARY OF INVENTION

Figure 1:
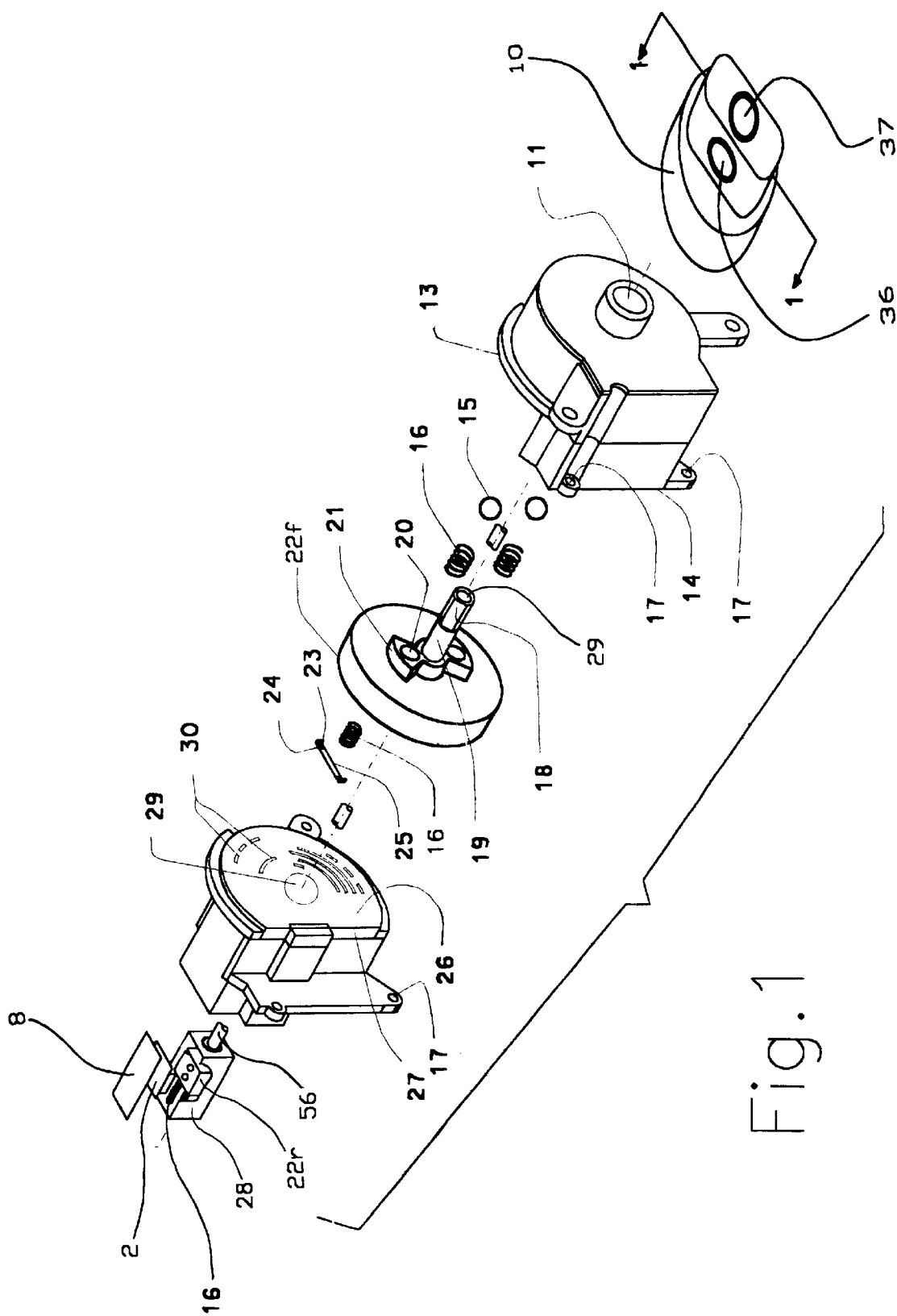
FIG. 1 is a isometric exploded view of the first embodiment of the combined headlight/wiper switch.

The invention is a switch that manually controls both lighting and windshield wiper circuits by turning on the lights before turning on the windshield wipers. When turning the switch off, the switch separates, differentiates, or isolates the lighting and windshield wiper functions by using different actuator movement or by use of a locking mechanism, which would prevent the lights from being turned off when the windshield wipers are being turned off.

The first embodiment can be used in conjunction with a conventional light switch. The switch comprises of a single actuator with a locking push-button, on/off switch in the center and a release button on the side. The first position turns on the parking lights and headlights, and the following positions turns on the various windshield wiper settings; for example, intermittent, slow, and fast. The switch is connected to the vehicle lighting and windshield wiper electrical systems and current is supplied from the battery; preferably through the ignition switch. If current to the switch is controlled by the ignition switch, then the ignition switch would supply current to the lighting system independently from the other ignition related circuits. This would eliminate the need for any additional components such as relays or diodes. The push button on/off switch in the center of the actuator connects and disconnects the lighting circuit from the switch; which transforms the switch back to a regular windshield wiper switch that can operate the windshield wipers without the parking lights and headlights being turned on. The switch uses a locking mechanism to stop the actuator from turning past the first position until the release button is pressed. Once the release button is pressed, the actuator can be turned to the off position. This prevents the lights from being accidentally turned off when the windshield wipers are being turned off.

The second embodiment is a switch that comprises of two actuators. The outer actuator controls the windshield wiper functions and the inner actuator controls both the lighting and windshield wiper functions. When the inner actuator is turned to the first and second positions, the parking lights and headlights are turned on, respectively. When the inner actuator is in the second position, it can engage the outer actuator if the outer actuator is in the off position. If the outer actuator is in any other position other than the off position, then the two actuators do not engage. The switch is designed so that once the two actuators are engaged, the inner actuator turns the outer actuator and controls the various windshield wiper speeds. By turning the inner actuator, the operator can turn on the lights and windshield wipers in one continuous movement. When turning the lights and windshield wipers off during the daytime, the inner actuator can turn off the windshield wipers followed by the lights. However, when turning the windshield wipers off at night, the windshield wipers must safely be able to be turned off while leaving the parking lights and headlights on. In which case the outer actuator would be used to turn off the windshield wipers and the inner actuator would be used to turn off the parking lights and headlights. Current is supplied to the switch from the battery and through the ignition switch. When the parking lights and headlights are turned on, current is supplied from the battery. When the parking lights, headlights and windshield wipers are turned on together by the inner actuator, current is supplied via the ignition switch.

The third embodiment is a variation of the pull-push type of switch which is also common in vehicles and can be used as a combined headlight/wiper switch. The switch comprises of a single actuator that can be turned to the various windshield wiper positions and can be pulled to turn on the parking lights and headlights. When the actuator is turned, the windshield wipers are turned to the first, second, and third positions which would normally represent the intermittent, slow, and fast speeds of the windshield wipers. When the actuator is pulled the lights are turned on; the first position turns on the parking lights and the second position turns on the headlights. When the parking lights and headlights are turned on, current is supplied directly from the battery. When the parking lights, headlights, and windshield wipers are turned on, current is supplied through the ignition switch. Since one actuator controls the lights and windshield wipers, it allows a convenient means to turn on both the lights and the various windshield wiper settings.

DESCRIPTION

Figure 2:
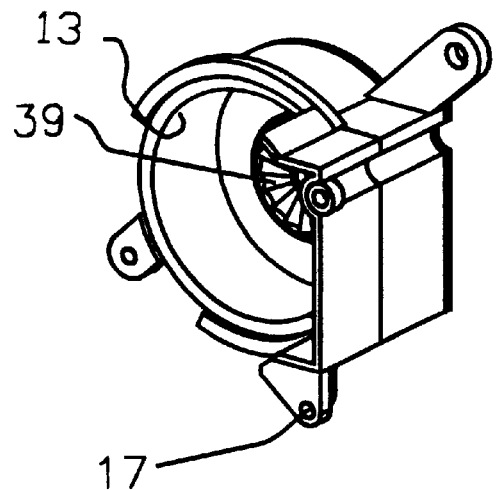
FIG. 2 is a rear view of front housing.

Referring now in detail to the first embodiment and in particular to FIGS. 1–9. The switch has a front housing 13 and a rear housing 27 that is held together by screws or rivets through hole 17, as shown in FIG. 1. The front housing 13 is made from metal or plastic and the rear housing 27 is made from a hard, non-conducting material. The front housing 13 has hole 11 that shaft 19 is inserted through. Shaft 19 is made of a rigid material like metal and has a beveled edge 18 that a knob or actuator 10 will be fitted on. Shaft 19 is attached to the front switch mechanism 22f which is made of a hard, nonconducting material. Shaft 19 and switch mechanism 22f can be made together in a single mold if desired. Shaft 19 and switch mechanism 22f has a hole 29 drilled through the center that allows rod with integral cam 56 to slide in and out. Rod 56 is made from a rigid material like metal and has the integral cam on the front end and the back end is attached to the rear switch mechanism 22r. The inside of front housing 13 has plurality of dent mechanisms or click grooves 39 in an array around hole 11, as illustrated in FIG. 2.

Figure 5:
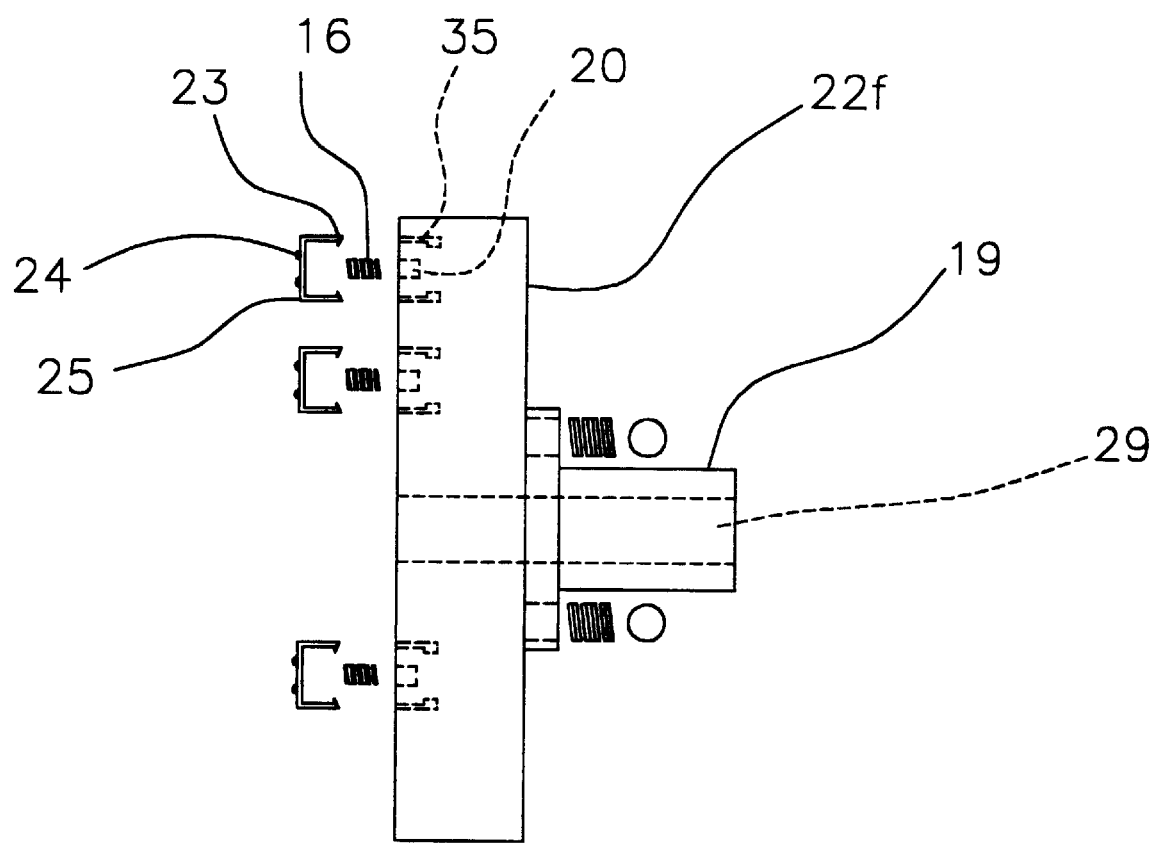
FIG. 5 is an exploded view of the front switch mechanism.

As shown in FIG. 1, spring 16 is inserted into blind hole 20 on the front side of switch mechanism 22f. When shaft 19, switch mechanism 22f, spring 16, and steel ball 15 is inserted into the front housing 13, spring 16 presses the steel ball 15 into the click grooves 39. The click grooves 39 are used to hold switch mechanism 22f in various positions, mainly the off position, the parking lights and headlights position, the intermittent windshield wiper position, the slow windshield wiper position, and the fast windshield wiper position. The back side of switch mechanism 22f has moveable contact elements 25a, 25b, and 25c. Each contact element has a corresponding blind hole 20, spring 16, and slots 35, as illustrated in FIG. 5. The moveable contact elements are made of metal like silver or copper that act as a conductor. The moveable contact elements are wedge shaped on the inner sides 23 and has nodes or rounded projections 24 on the top side. Spring 16 is inserted into blind hole 20 and the moveable contact elements are inserted into slots 35. The wedge shaped inner sides 23 prevents the contact elements from coming out due to the force of spring 16. When the rear housing 27 is attached to front housing 13, spring 16 presses the contact elements on to the front side 26 of the rear housing 27.

The back side of rear housing 27 has a chamber or rectangular housing 28 that encloses the switch mechanism 22r, as shown in FIG. 1. The rectangular housing has a cover 8 that is held in place by screws. This would allow the switch mechanism 22r to be placed in the rectangular housing 28. Hole 29 is drilled through the center of front side 26 to the rectangular housing 28. Rod 56 is inserted through hole 29 and is attached to the front side of switch mechanism 22r. Rod 56 moves the switch mechanism 22r back and forth. The switch mechanism 22r has two moveable contact elements 25d and 25e, each with a corresponding spring 16, blind hole 20, and slots 35 on the bottom side and a typical on/off locking mechanism 2 on the top side. The back side of switch mechanism 22r has blind hole 20 that holds spring 16 in place. The bottom side of the rectangular housing 28 as well as the front side 26 has stationary or fixed contact plates 30. The rear housing 27 is integrally formed with the fixed contact plates 30 and connector terminals 31 by an insert molding. The connector terminal 31 would be adapted to be coupled to a terminal connector of a vehicle wiring harness.

Figure 3:
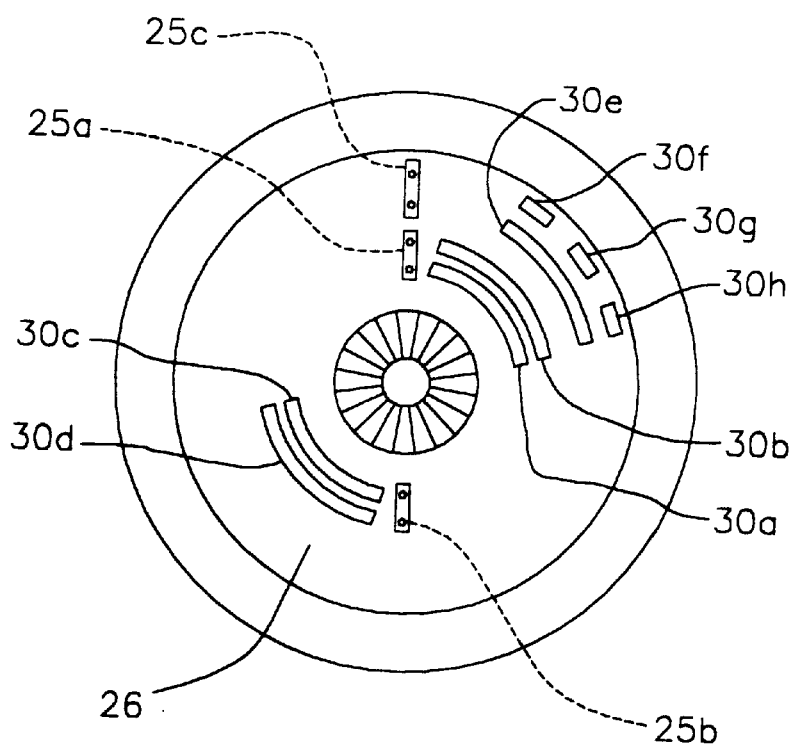
FIG. 3 is an enlarged plan view of contact plates on front side of rear housing.
Figure 4A:
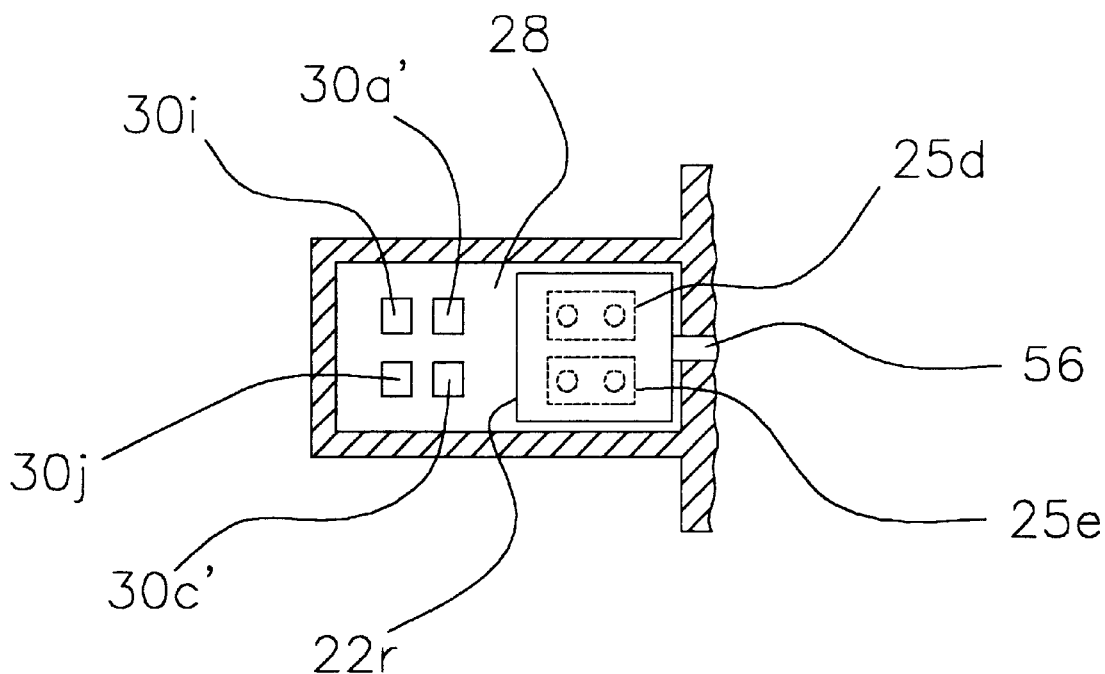
FIG. 4a is an enlarged plan view of contact plates on bottom side of rectangular housing and showing rear switch mechanism in the disabled position.

In describing the fixed contact plates 30 on the front side 26, contact plate 30a is connected directly to contact plate 30a' on the bottom side of rectangular housing 28, as shown in FIGS. 3 and 4a. Contact plate 30b is connected to the parking lights, contact plate 30c is connected directly to contact plate 30c' on the bottom side of rectangular housing 28, contact plate 30d is connected to the headlights, contact plate 30e is connected to the ignition switch, contact plate 30f is connected to the intermittent windshield wiper circuit, contact plate 30g is connected to the slow windshield wiper circuit, and contact plate 30h is connected to the fast windshield wiper circuit. The fixed contact plates 30 on the bottom side of the rectangular housing 28, as shown in FIG. 4a is as follows: contact plate 30i and 30j are connected to the ignition switch, the last two contact plates 30a' and 30c' are connected directly to contact plates 30a and 30c on the front side 26.

Figure 6:
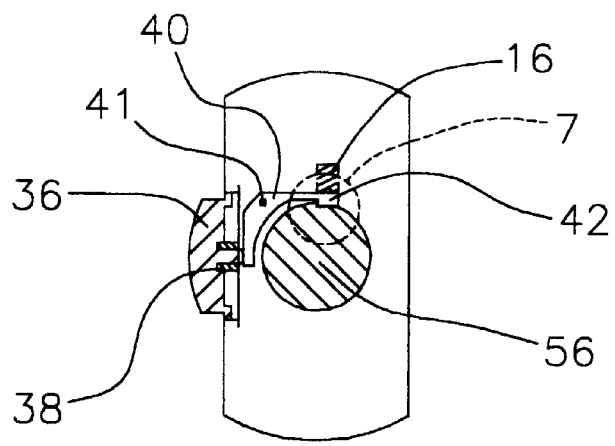
FIG. 6 is a cross-sectional view of actuator taken along line 1—1 of FIG. 1.
Figure 7:
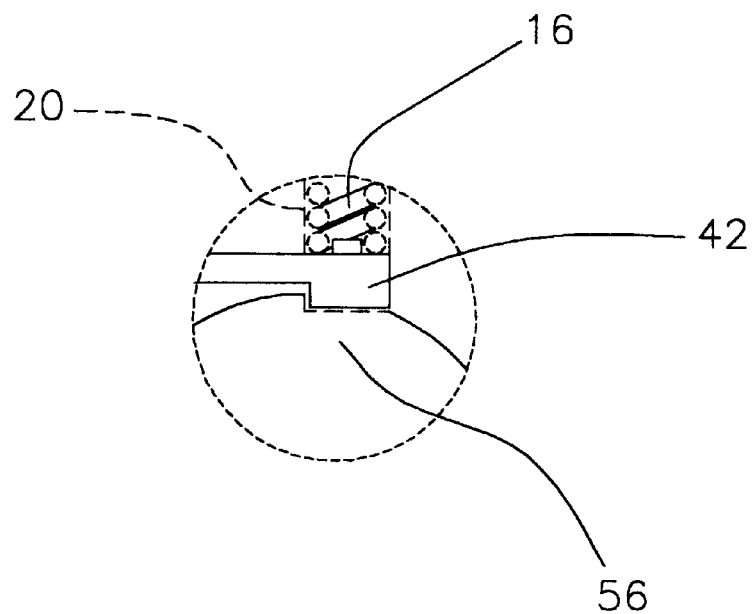
FIG. 7 is a partly enlarged view of FIG. 6.

Actuator 10 which is fitted on shaft 19 has two buttons 36 and 37, as shown in FIG. 1. Button 37 is a on/off button and is connected to the front end of rod 56. When button 37 is depressed or enabled, rod 56 moves switch mechanism 22r and compresses springs 16. The on/off locking mechanism on the top side of switch mechanism 22r keeps the switch mechanism and button 37 depressed. When button 37 is pressed again, the locking mechanism releases switch mechanism 22r and spring 16 moves the switch mechanism 22r and button 37 back to the original position. Button 36 is a release button. Button 36 has a spring 38 that continually forces button 36 out, as illustrated in FIG. 6. The end of button 36 rests against one end of lever 40. Lever 40 is attached to actuator 10 by a pin 41 that allows lever 40 to pivot. There is a blind hole 20 in actuator 10 that holds spring 16 in place. Spring 16 presses the engaging tab 42 on the end of lever 40 against rod 56, as shown in FIG. 7. The engaging tab 42 prevents actuator 10 from turning past the integrated cam on rod 56 until button 36 is depressed. Also the side of the integrated cam is beveled so that when button 37 is released and rod 56 moves out, the engaging tab 42 on the lever is not on the integrated cam. When button 37 is disabled, actuator 10 can be turned without being stopped.

The operation is as follows. When the actuator is in the off position, the contact elements 25a–25c does not come in contact with any of the contact plates 30a–30h, as shown in FIG. 3. When the actuator is turned clockwise to the first position, the nodes on the contact element 25a make contact with contact plates 30a and 30b, and the nodes on contact element 25b makes contact with contact plates 30c and 30d. Current flows from contact plate 30a through contact element 25a to contact plate 30b. Current also flows from contact plate 30c through contact element 25b to contact plate 30d depending on the position of switch mechanism 22r and the ignition switch. If button 37 is out or disabled, it is in the off position. The contact elements 25d and 25e on the switch mechanism 22r do not come in contact with contact plates 30a', 30c', 30i, and 31j, as shown in FIG. 4a. Hence, no current can flow to contact plate 30a and 30c, and the parking lights and headlights will not be turned on. The switch can then be used as a conventional windshield wiper switch.

Figure 4B:
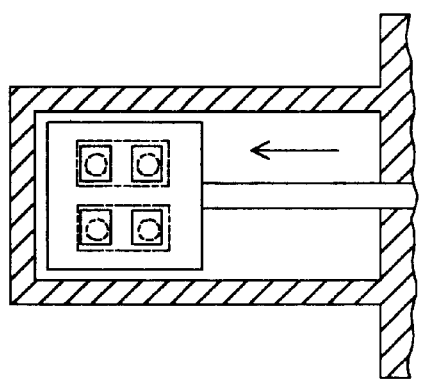
FIG. 4b is an enlarged plan view of contact plates on bottom side of rectangular housing and showing rear switch mechanism in the enabled position.

When button 37 is depressed or enabled, switch mechanism 22r moves the contact elements 25d and 25e, as illustrated in FIG. 4b. The nodes on contact element 25d make a connection between contact plates 30i and 30a', and the nodes on contact element 25e make a connection between contact plates 30j and 30c'. If the ignition switch is on, current flows from contact plate 30i, which is connected to the ignition switch, through contact element 25d to contact plate 30a', and from contact plate 30a through contact element 25a to contact 30b, which is connected to the parking lights. Current also flows from contact plate 30j, which is connected to the ignition switch, through contact element 25e to contact plate 30c', and from contact plate 30c through contact element 25b to contact plate 30d, which is connected to the headlights. The button 37 permits the switch to operate as a combined headlight/wiper switch or as a conventional windshield wiper switch.

When the actuator is turned to the second position, the nodes on the contact element 25c make contact with contact plates 30e and 30f, as shown in FIG. 3. Current flows from the ignition switch to the intermittent windshield wiper circuit. Contact elements 25a and 25b continue to make contact between contact plates 30a and 30b, and 30c and 30d respectfully for the remainder of the windshield wiper positions. When the actuator is turned to the third position, the nodes on the contact element 25c continues to make contact with contact plates 30e and also makes contact with contact plate 30g. Current flows from the ignition switch to the slow windshield wiper circuit. When the actuator is turned to the fourth position, the nodes on the contact element 25c continues to make contact with the contact plates 30e and also makes contact with contact plate 30h. Current then flows from the ignition switch to the fast windshield wiper circuit.

Figure 9:
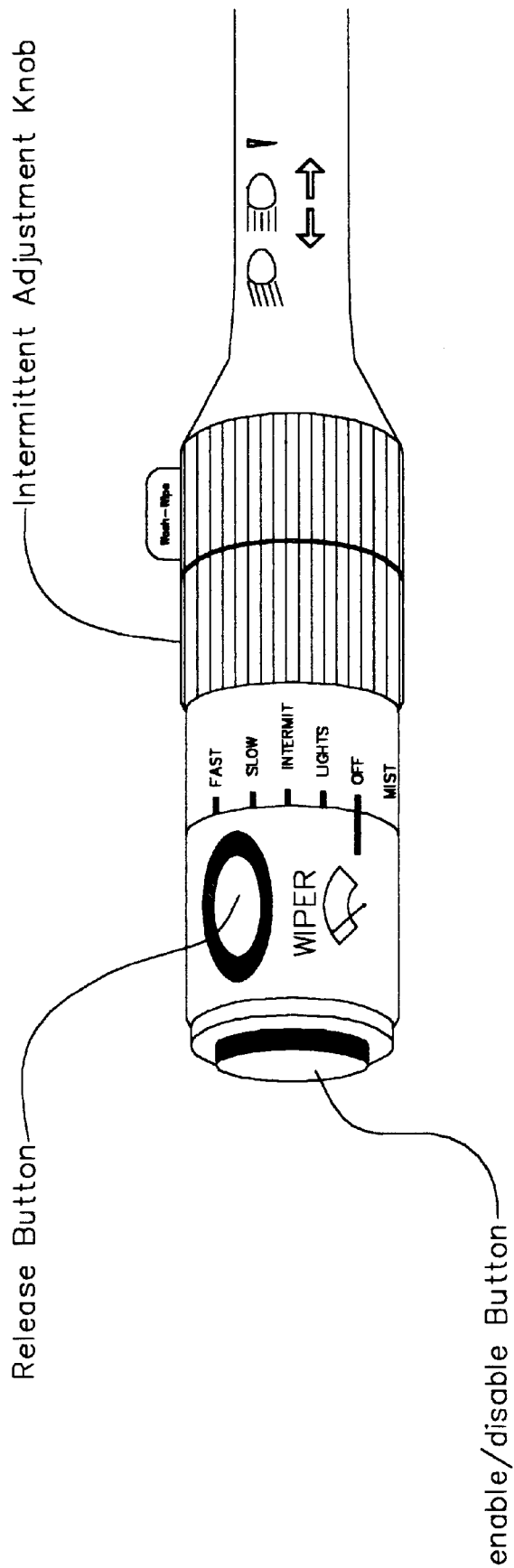
FIG. 9 is a perspective view of a column mounted combined headlight/wiper switch.

When turning the windshield wipers off, the actuator is turned counter-clockwise. The actuator will turn until it reaches the first position, then it will stop. The integrated cam on the end of rod 56 prevents lever 40 and actuator 10 from turning past the first position. In order to turn actuator 10 to the off position, button 36 must be pressed. This would prevent the lights from being accidentally turned off while the windshield wipers are being turned off. And this locking means would be especially useful on a column mounted switch, when the operator may not be able to actually look directly at the switch positions, as shown in FIG. 9. The operator knows that the lights will stay on until button 36 is pressed to allow the actuator to turn all the way to the off position. When button 37 is disabled or in the off position, the integrated cam on the end of rod 56 moves out and does not effect the engaging tab 42 on lever 40. The actuator 10 in this case turns uninterrupted to the off position. When button 37 is enabled and the combined headlight/wiper switch is turned on, current to the parking lights, headlights, and windshield wipers will be controlled by the ignition switch. This allows a convenient means to prevent the lights from being accidentally left on during daytime use in inclement weather. The lights can also be turned on at any time using the main light switch.

Figure 8:
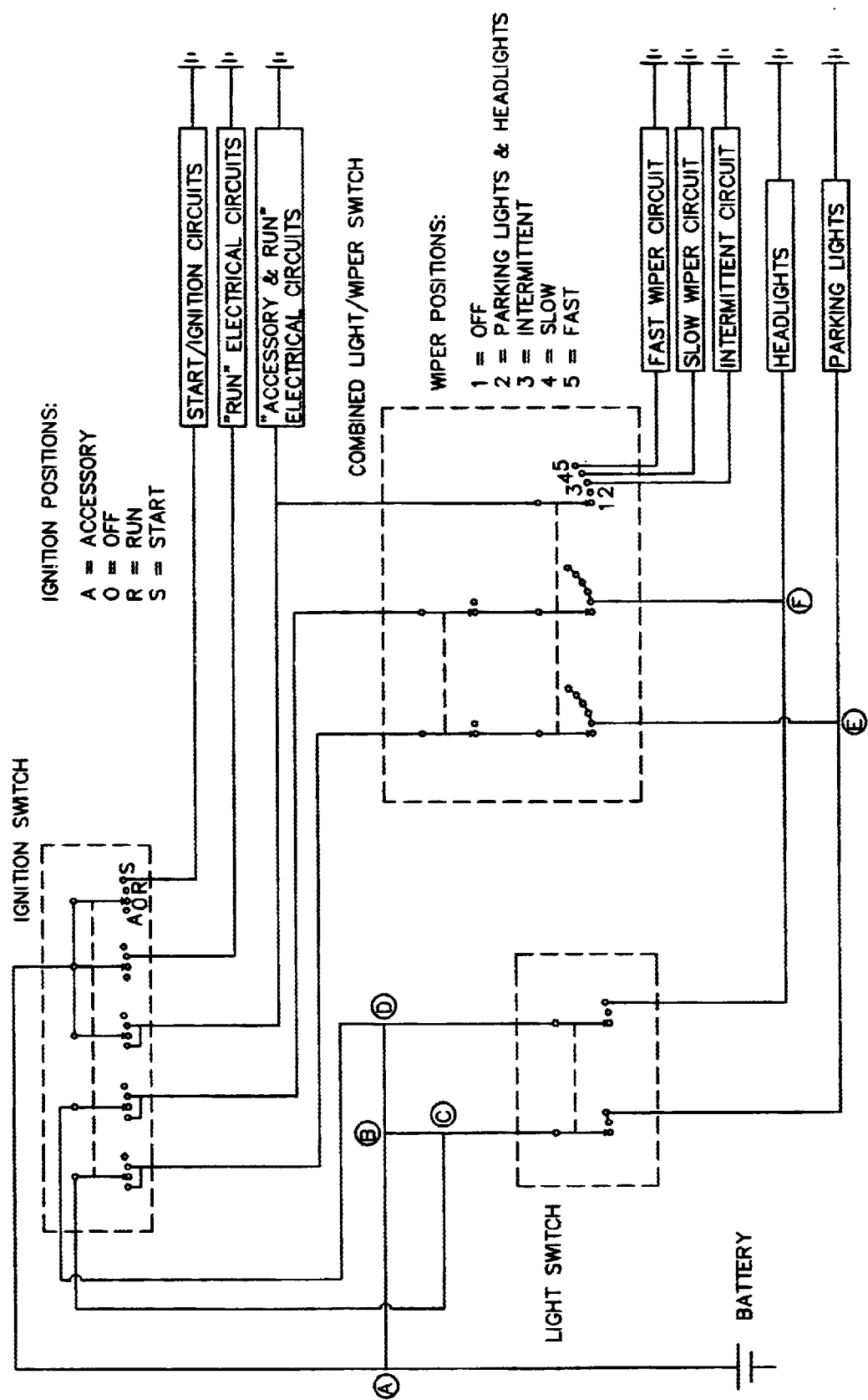
FIG. 8 is a circuit diagram for the first embodiment.

In describing the electrical circuit for this switch, as mentioned before, it would be a desirable feature to have the lights capable of being turned off when the ignition switch is turned off. Also it is common practice to have current to the light switch supplied from the battery as well. Since this invention can be used in conjunction with a conventional light switch, current to the conventional light switch would be supplied from the battery and current to the combined headlight/wiper switch would be controlled by the ignition switch. In order to operate the parking lights and headlights using two switches and without using relays or diodes, the ignition switch controls current to the combined headlight/wiper such that the current to the parking lights and headlights would be independent of other circuits that are normally supplied current through the ignition switch. By having the ignition switch supply current to the lighting circuit independently from the other ignition circuits, current would be prevented from flowing to other ignition related circuits via the main light switch. A simplified circuit would have current flowing from the battery to nodes C and D, as shown in FIG. 8. From the Kirchhoff's current law, current that flows into nodes C and D is the same that flows out. When current flows out of node C, it either goes through the main light switch into node E or through the ignition switch to the combined headlight/wiper switch into node E, or a combination of the two. Hence the current that flows out of node C is equal to the current that flows into node E. The current that flows out of node E goes to the parking lights. When current flows out of node D, it either goes through the light switch into node F or through the ignition switch to the combined headlight/wiper switch into node F, or a combination of the two. Likewise, the current that flows out of node D is equal to the current that flows into node F. The current that flows out of node F goes to the head lights. The operation of the lights does not effect other ignition related circuits; and the lights turned on by the combined headlight/wiper switch can be turned off then the ignition switch is turned off.

Referring now in detail to the second embodiment in particular to FIGS. 10–15. The switch has a front housing 13a and a rear housing 27a that is held together by screws or rivets through holes 17, as shown in FIGS. 10a and 10b. The front housing 13a is made from metal or plastic and the rear housing 27a is made from a hard, non-conducting material. The switch has two actuators 32i and 32o. The inside of front housing 13a has plurality of click grooves 39 in an array around hole 11. Shaft 19a is inserted through hole 11 and is made of a rigid material like metal, as shown in FIG. 11a. The end of shaft 19a has a beveled edge 18 that outer actuator 32o will be fitted on. Shaft 19a is attached to outer switch mechanism 22o which is made of a hard, nonconducting material. The shaft 19a and outer switch mechanism 220 can be made together in a single mold. Spring 16 is inserted into blind hole 20 on the front side of outer switch mechanism 22o. When shaft 19a, outer switch mechanism 22o, spring 16 and steel ball 15 is inserted into the front housing 13a, spring 16 presses the steel ball 15 into the click grooves 39. The click grooves 39 are used to hold switch mechanism 22o in various positions, mainly the off position, the intermittent windshield wiper position, the slow windshield wiper position, and the fast windshield wiper position. The back side of outer switch mechanism 22o has blind hole 20 that holds spring 16 in place, as illustrated in FIG. 11b. The outer switch mechanism 22o also has slots 35 that moveable contact element 25h is inserted. The moveable contact elements are made of metal like silver or copper that act as a conductor. Moveable contact element 25h has two nodes or rounded projections 24, and contact element 25f and 25g has three nodes. The inner side 23 of the moveable contact elements are wedge shaped. Spring 16 is inserted into blind hole 20 and moveable contact element 25h is inserted into slots 35. The wedge shaped sides 23 prevents the contact element 25h from coming out due to the force of spring 16.

Figure 11A:
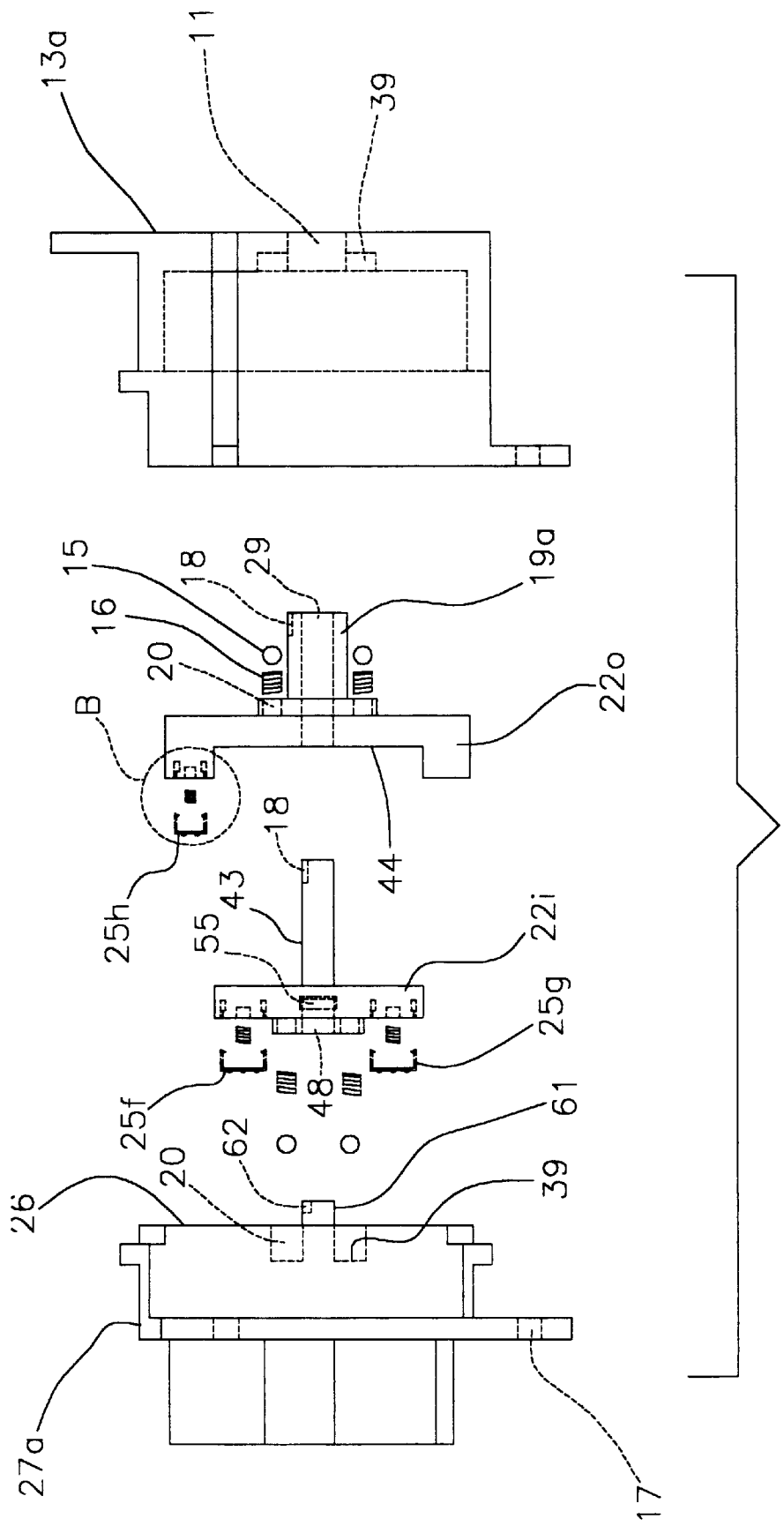
FIG. 11a is an exploded side view of the outer and inner switch mechanism of the second embodiment.
Figure 11B:
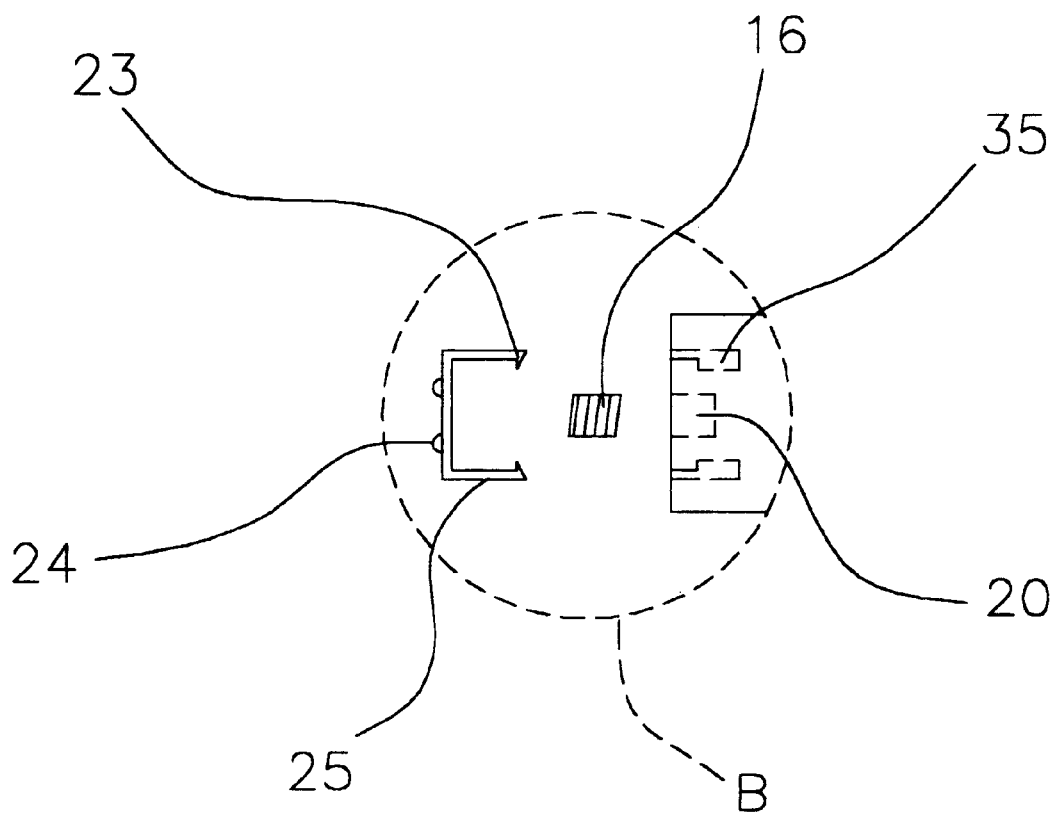
Figure 12:
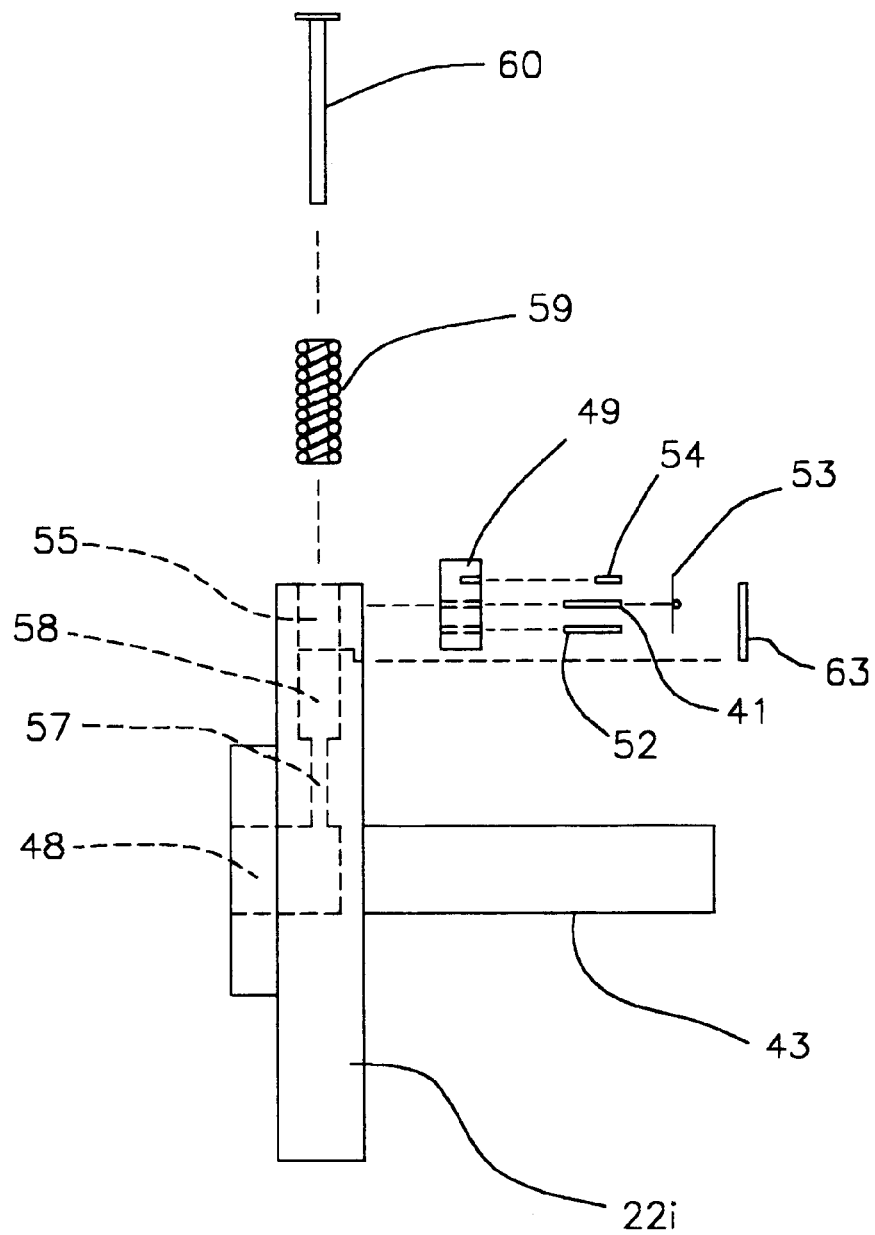
FIG. 12 is an exploded side view of inner switch mechanism of the second embodiment.
Figure 14A:
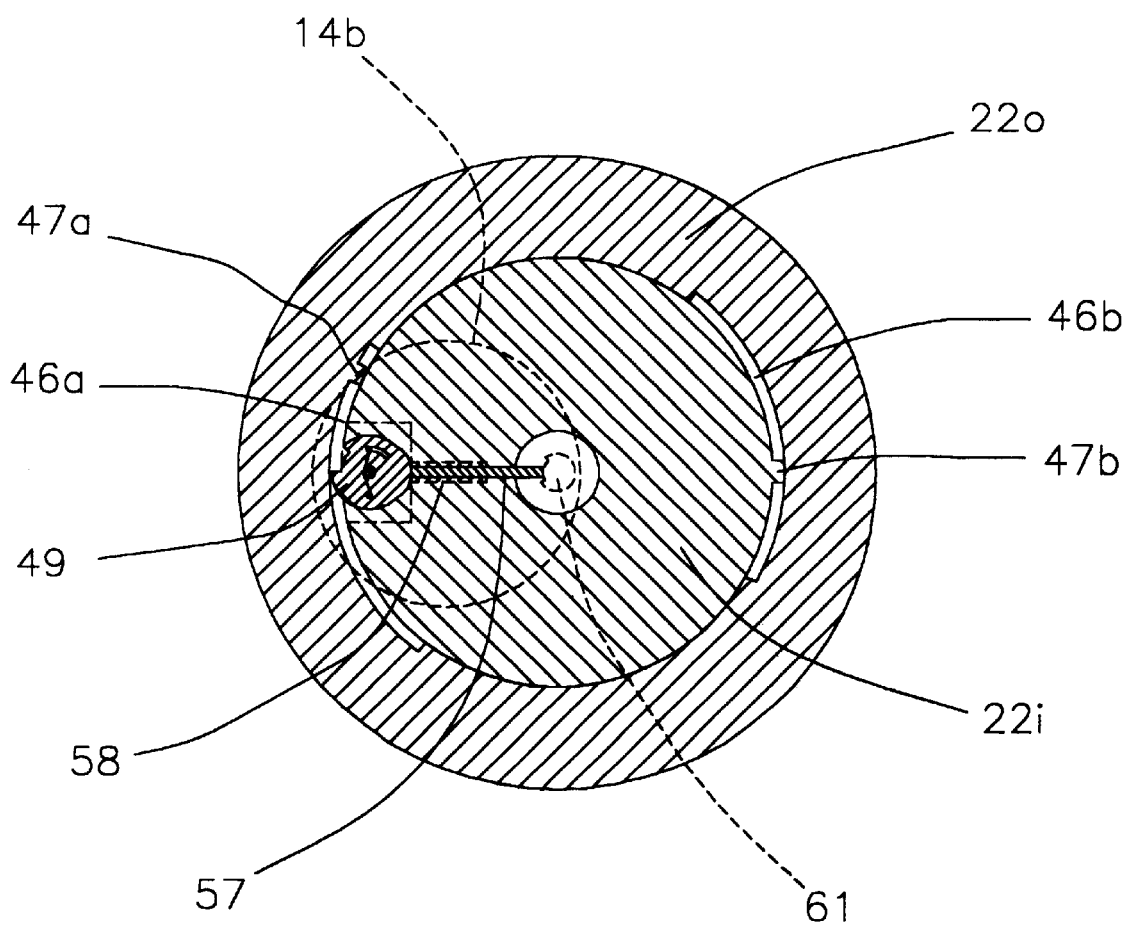
FIG. 14a is a cross-sectional view taken along line 2—2 of the outer and inner switch mechanism of a second embodiment.
Figure 14B:
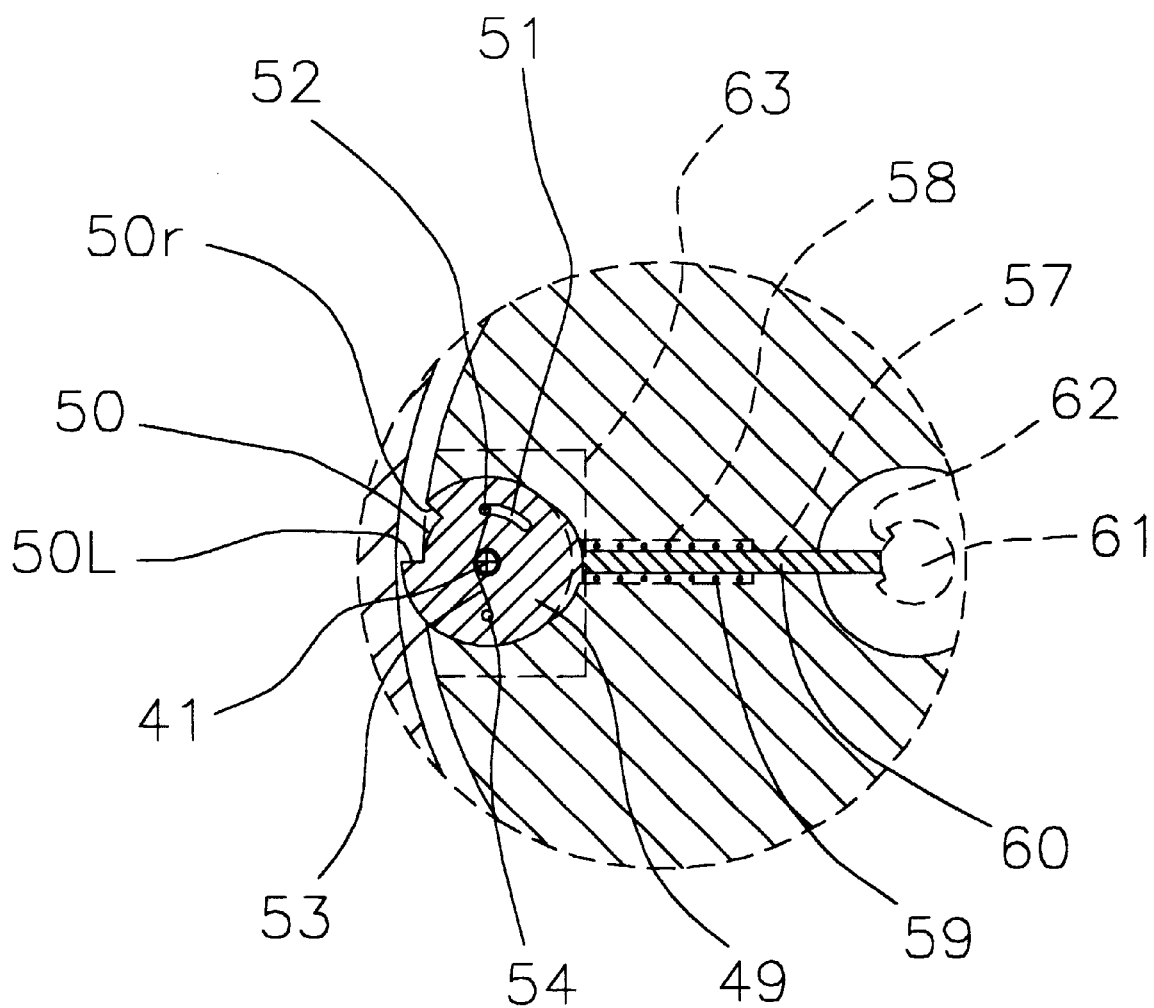

Shaft 19a and outer switch mechanism 22o has a hole 29 drilled through the center, as shown in FIG. 11a. The diameter of hole 29 is the same as shaft 43. The back side of outer switch mechanism 22o has a hole 44 that is molded or bored to the diameter and depth of the inner switch mechanism 22i. Portions of hole 44 are notched out 46a and 46b to allow clearance for two projections in the inner switch mechanism 22i, as illustrated in FIG. 14a. There is also a square projection 47a that extends out of the notched section 46a. Shaft 43 is attached to inner switch mechanism 22i, as shown in FIG. 11a, which is also made of a hard, nonconducting material. Shaft 43 and inner switch mechanism 22i will fit inside the holes 44 and 29 of outer switch mechanism 22o. Shaft 43 extends farther than shaft 19a and also has a beveled edge 18 that actuator 32i will be attached. The inner switch mechanism 22i has two moveable contact elements 25f and 25g, each with blind hole 20, spring 16, and slots 35. There is another blind hole 48 in the center of inner switch mechanism 22i. The inner switch mechanism 22i has a slit or cavity 55 cut into the outer edge that wheel with cam lobe 49 is inserted, as shown in FIG. 12. Wheel 49 has a sectional notch 50 cut into its outer edge and has a hole drilled through the center that pin 41 is inserted through to allow wheel to rotate, as illustrated in FIG. 14b. Part of wheel 49 extends beyond the diameter of inner switch mechanism 22i and its projection is equal to the depth of notched section 46a. Wheel 49 has a circular groove 51 that is cut through and pin 52 is inserted through groove 51 and into inner switch mechanism 22i, which limits wheel 49 rotational movement. Wheel 49 also has a pin 54 that is inserted into the side of the wheel. Torsional spring 53 is centered on pin 41 with the ends on pins 52 and 54. If wheel 49 is turned and then released, then spring 53 allows wheel to return to its initial position. The side of wheel 49 can be countered drilled to the depth of spring 53 to allow spring to be recessed into wheel. There is a cover 63 that is recessed into the side of inner switch mechanism 22i that allow placement of wheel 49 in cavity 55. There is a square projection 47b that extends beyond the diameter of inner switch mechanism 22i and on the side opposite of wheel 49, as shown in FIG. 14a. This projection is equal to the depth of notch 46b in outer switch mechanism 22o. There is a hole 58 bored through cavity 55 to about half way to the center of inner switch mechanism 22i, as illustrated in FIG. 12. There is a smaller hole 57 that is bored through hole 58 to the center of blind hole 48. Spring 59 is inserted into hole 58 and rod 60 is inserted through spring 59 into hole 57. Spring 59 forces rod 60 against the cam lobe on wheel 49.

Figure 10A:
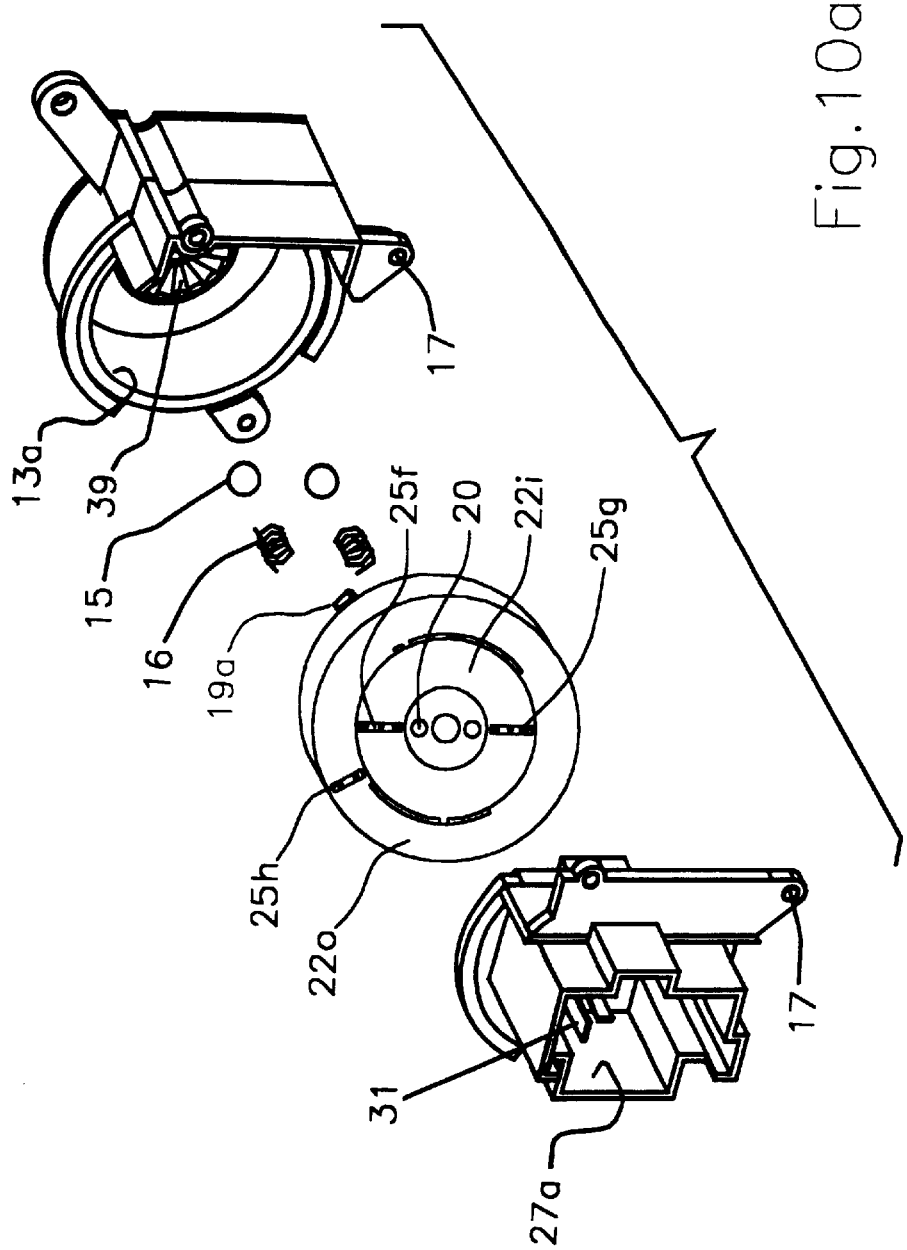
FIG. 10a is an isometric exploded view of the second embodiment of the combined headlight/wiper switch.
Figure 10B:
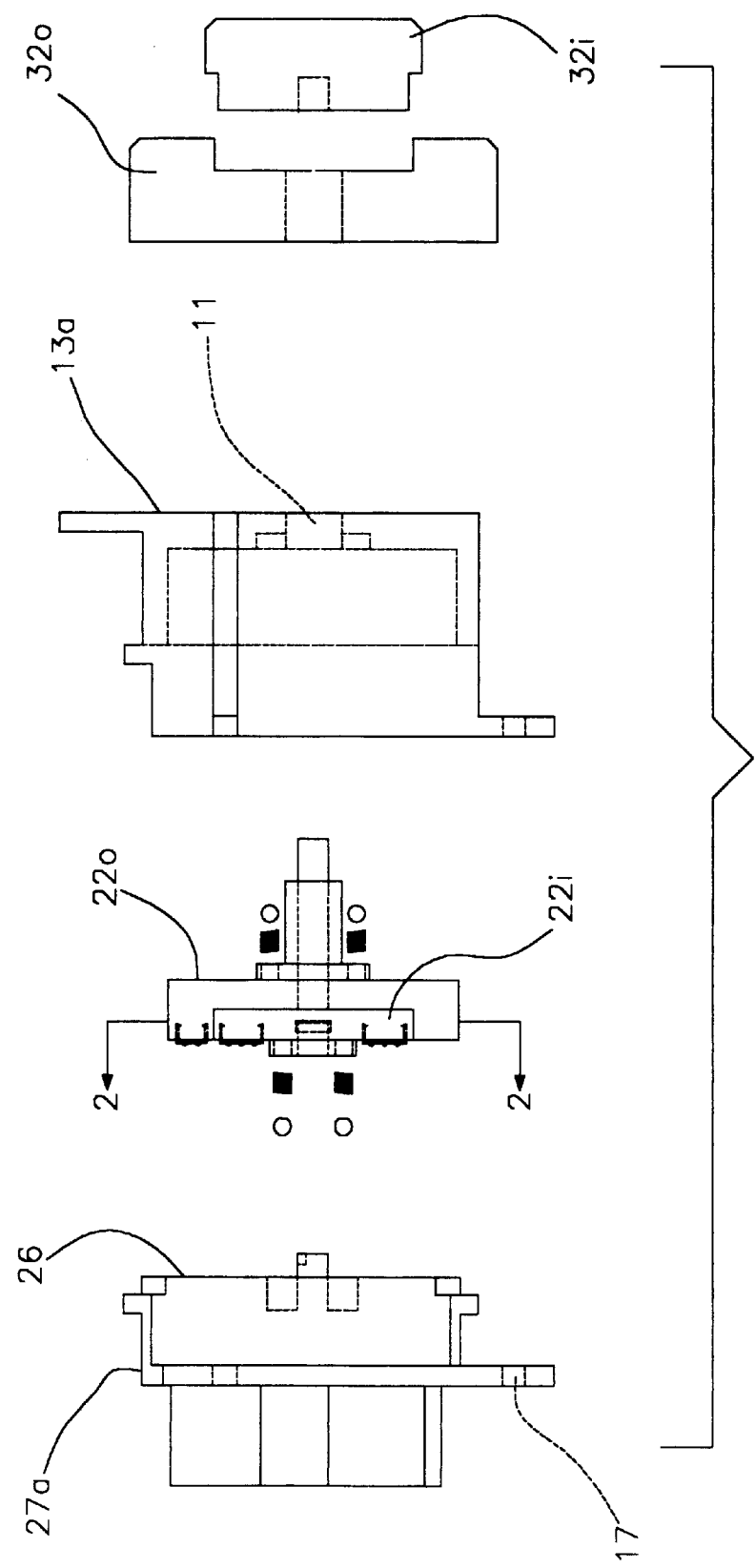
FIG. 10b is an exploded side view of the second embodiment

The center of rear housing 27a has a circular extension 61 with a integral cam 62 on the end, as shown in FIG. 11a. There are a plurality of click grooves 39 recessed in an array around circular extension 61. Spring 16 is inserted into blind hole 20 on the back side of inner switch mechanism 22i. When inner switch mechanism 22i is inserted into the circular extension 61, spring 16 presses the steel ball 15 into the click grooves 39. The click grooves 39 are used to hold inner switch mechanism 22i in various positions, mainly the off position, the parking lights position, the headlights position, the intermittent windshield wiper position, the slow windshield wiper position, and the fast windshield wiper position. The cam lobe on wheel 49 presses rod 60 against the integral cam 62, as illustrated in FIG. 14b. The integral cam along with rod 60 limits the inner switch mechanisms' movement. When rear housing 27a is attached to front housing 13a, spring 16 presses contact elements 25f, 25g, and 25h on to the front side 26 of the rear housing 27a, as shown in FIG. 10b. The rear housing 27a is integrally formed with fixed contact plates 30 and connector terminals 31 by an insert molding. The connector terminal 31 would be adapted to be coupled to a terminal connector of a vehicle wiring harness.

Figure 13:
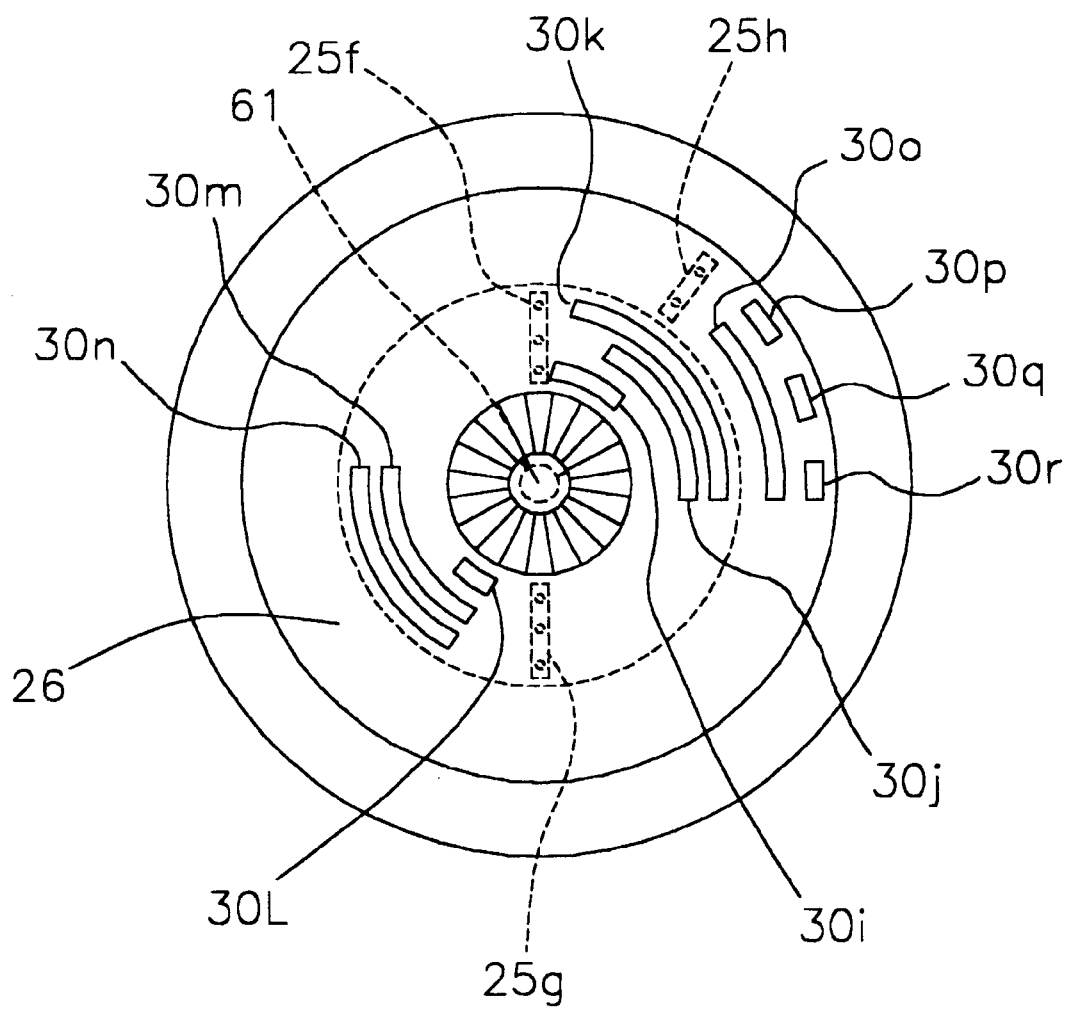
FIG. 13 is an enlarged plan view of contact plates on front side of rear housing of the second embodiment.

In describing the fixed contact plates 30, as shown in FIG. 13, contact plate 30i is connected to the vehicle's battery, contact plate 30j is connected to the ignition switch, contact plate 30k is connected to the parking lights, contact plate 30L is connected to the battery, contact plate 30m is connected to the ignition switch, contact plate 30n is connected to the headlights, contact plate 30o is connected to the ignition switch, contact plate 30p is connected to the intermittent windshield wiper circuit, contact plate 30q is connected to the slow windshield wiper circuit, and contact plate 30r is connected to the fast windshield wiper circuit.

The operation is as follows. When actuator 32i and 32o are in the off position, the contact elements 25f, 25g, and 25h does not come in contact with any of the contact plates 30i–30r, as illustrated in FIG. 13. When actuator 32o, which controls the windshield wiper circuit, is turned clockwise the outer switch mechanism 22o moves to the first position. The nodes on contact element 25h make contact with contact plates 30o and 30p. Depending on the position of the ignition switch, current can flow from the ignition switch to contact plate 30o, through contact element 25h to contact plate 30p which is connected to the intermittent windshield wiper circuit. Contact element 25h continues to make contact with contact plate 30o for the remainder of the windshield wiper positions. When actuator 32o and outer switch mechanism 22o are moved to the second position, contact element 25h makes contact with contact plates 30o and 30q. Current flows from the ignition switch to contact plate 30o, through contact element 25h to contact plate 30q which is connected to the slow windshield wiper circuit. When actuator 32o and outer switch mechanism 22o are moved to the third position, contact element 25h makes contact with contact plates 30*o* and 30*r*. Current flows from the ignition switch to contact plate 30*o*, through contact element 25*h* to contact plate 30*q* which is connected to the fast windshield wiper circuit. The reverse sequence is followed when turning the windshield wipers off.

By using actuator 32*o* only, the windshield wipers can be turned on without turning on the parking lights and headlights if desired. When actuator 32*i*, which controls the lighting circuit and can also control actuator 32*o*, is turned clockwise the inner switch mechanism 22*i* moves to the first position. The nodes on the contact element 25*f* make contact with contact plates 30*i* and 30*k*. Current flows from the battery to contact plate 30*i*, through contact element 25*f* to contact plate 30*k* which is connected to the parking lights. The nodes on contact element 25*g* does not make contact with any contact plates. When actuator 32*i* and inner switch mechanism 22*i* are moved to the second position, contact element 25*f* continues to make contact with contact plates 30*i* and 30*k*, and also makes contact with contact plate 30*j*. Current flows from the battery to contact plate 30*i*, through contact element 25*f* to contact plate 30*k* to the parking lights. Depending on the position of the ignition switch, current can flow from the ignition switch to contact plate 30*j*, through contact element 25*f* to contact plate 30*k* which is connected to the parking lights. Contact element 25*g* makes contact with contact plates 30L, 30*m*, and 30*n*. Current flows from the battery to contact plate 30*l*, through contact element 25*g* to contact plate 30*n* which is connected to the headlights; current can also flow from the ignition switch to contact plat 30*m*, through contact element 25*g* to contact plate 30*n* to the headlights.

Figure 14C:
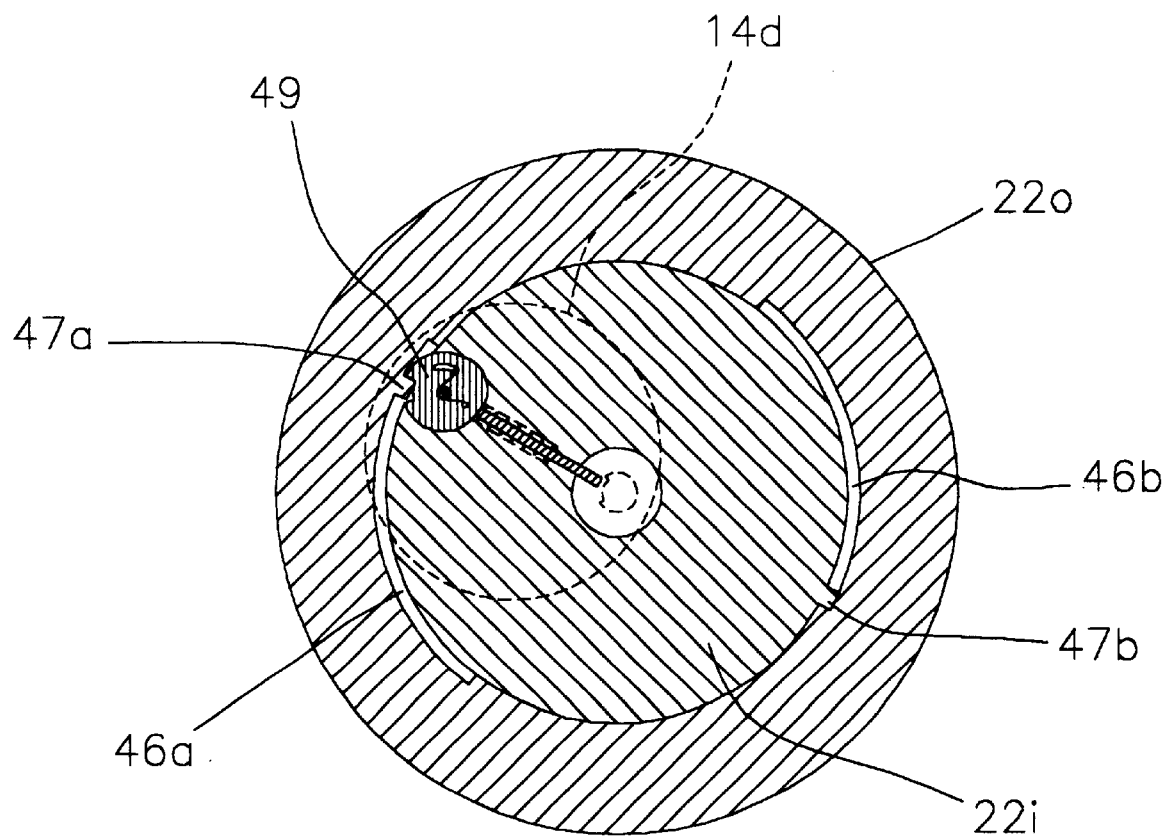
FIG. 14c is a cross-sectional view taken along line 2—2 showing the outer and inner switch mechanism in the engaged position.
Figure 14D:
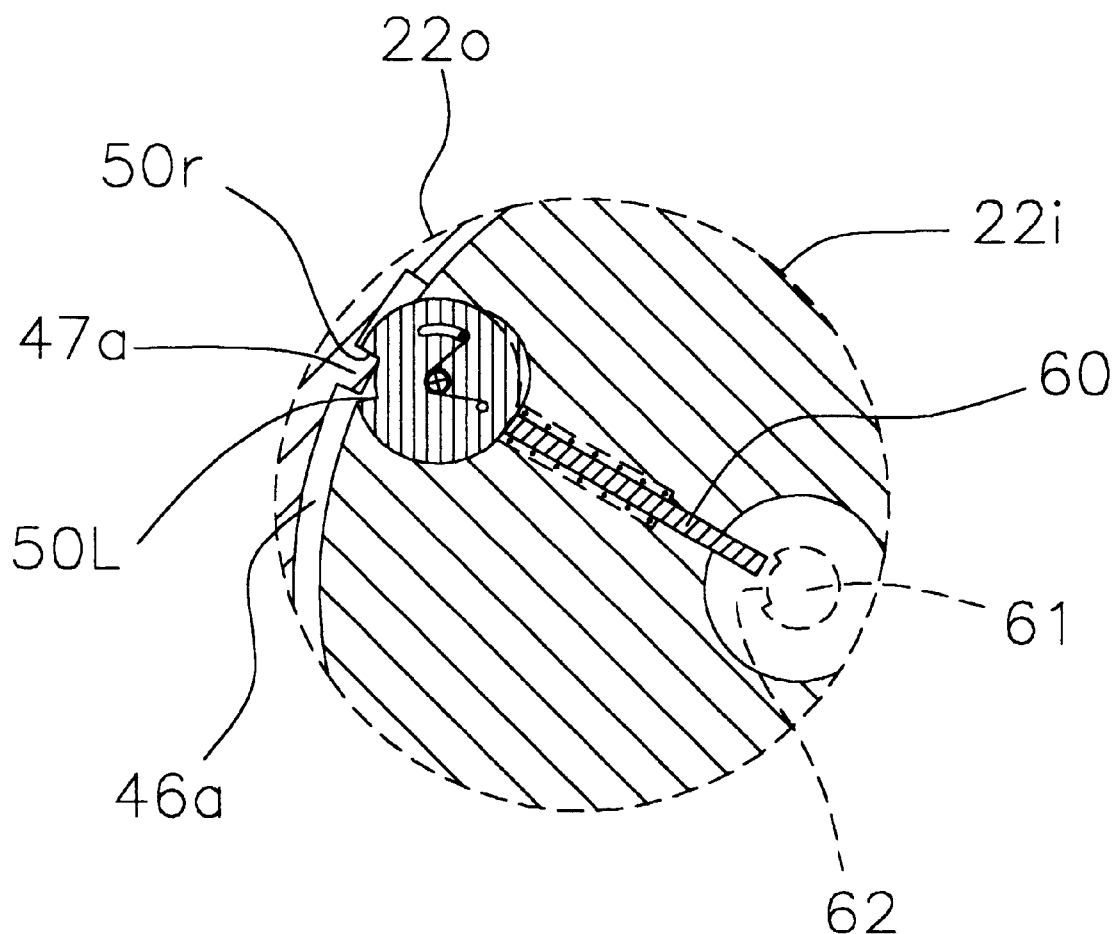
FIG. 14d is a partly enlarged view of FIG. 14c.
Figure 15:
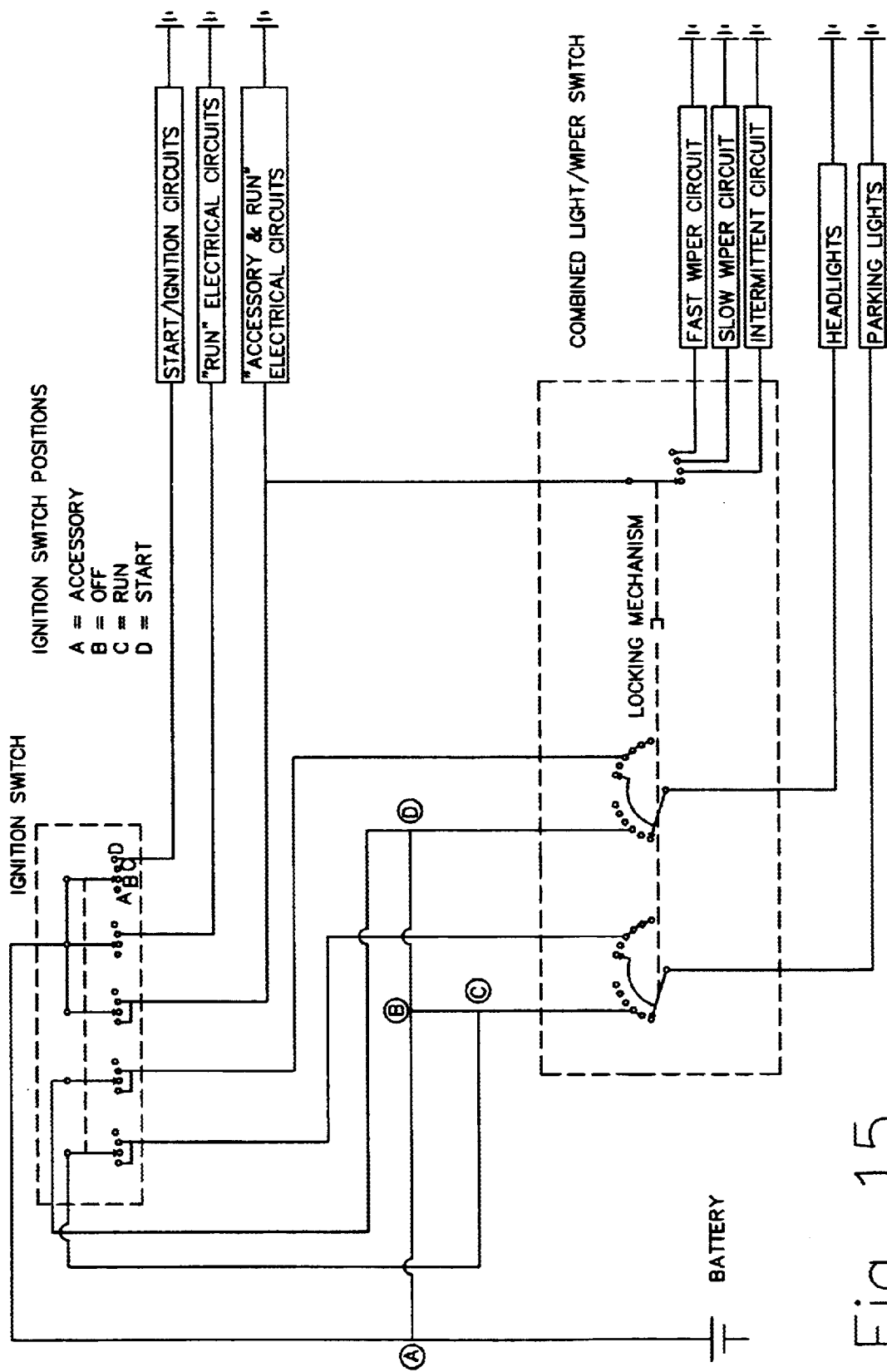
FIG. 15 is a circuit diagram for the second embodiment.

Since current is being supplied directly from the battery and through the ignition switch, the ignition switch would supply current to the parking lights and headlights independently from the other ignition related circuits. This would prevent the current from flowing to other ignition related circuits via the lighting circuit without the uses of relays or other such devices. A simplified circuit diagram would have current flowing from the battery to nodes C and D FIG. 15. The current that flows out of node C is the same that flows into contact element 25*f* and depending on position of inner switch mechanism 22*i*, current will flow into contact plate 30*k* which in turn flows to the parking light circuit. In describing the headlight circuit, the current that flows out of node D is the same that flows into contact element 25*g* and depending on the position of inner switch mechanism 22*i*, current will flow into contact plate 30*n* which in turn flows to the headlight circuit. When actuator 32*i* is in the second position, current to the parking and headlights can be supplied from both the battery and the ignition switch; this provides a continuous supply of current to the parking head and headlights when switching from the battery to ignition supplied current. When turning actuator 32*i* and inner switch mechanism 22*i* through the first and second positions, square projection 47*b* moves along notched section 46*b* and the top part of wheel 49 moves along the inside of notched section 46*a*, as illustrated in FIG. 14*c*. As the inner switch mechanism 22*i* is turned to the second position two possible movements are possible.

First, if the outer switch mechanism 22*o* is in its off position, the left side of sectional notch 50L on wheel 49 will make contact with front side of projection 47*a*. Continued turning of inner switch mechanism 22*i* causes square projection 47*a* to rotate wheel 49, as illustrated in FIG. 14*c*. As wheel 49 rotates, tension is place on spring 53 and cam lobe on wheel allows rod 60 to move up. Rod 60 moves above the integrated cam 62 on the end of circular extension 61. When inner switch mechanism 22*i* stops on the second position, the projection 47*a* would have caused wheel 49 to rotate such that the right side of sectional notch 50*r* will have moved up to make contact with back side of projection side 47*a*; and projection 47*b* on the inner switch mechanism 22*i* will make contact with the end of notched section 46*b*, as illustrated in FIG. 14*c*. When the inner switch mechanism 22*i* is turned to the third position, projection 47*b* moves outer switch mechanism 22*o* to the intermittent wiper position as described early. Contact element 25*f* continues to make contact with contact plates 30*j* and 30*k*, and contact element 25*g* continues to make contact with contact plate 30*m* and 30*n*. When the inner switch mechanism 22*i* is turned to the fourth and fifth positions, projection 47*b* continues to moves outer switch mechanism 22*o* to the slow and fast windshield wiper positions. This provides an easy way to turn on the lights and windshield wipers using a single actuator. When the inner actuator is in the third, fourth, and fifth positions, current to the parking lights and headlights will be supplied through the ignition switch, as shown in FIG. 13. This would help prevent the lights from being accidentally left on when the windshield wipers are on during the daytime in inclement weather.

The switch can be turned off in two ways. If it is during the daytime, actuator 32*i* which controls the inner switch mechanism 22*i* is used to turn off the windshield wipers followed by the parking lights and headlights. When the inner switch mechanism 22*i* is turned counter-clockwise, the right side of sectional notch 50*r* moves square projection 47*a* which in turn moves outer switch mechanism 22*o*, as shown in FIG. 14*c*. The top part of the integrated cam 62 will prevent rod 60 from moving down and in turn will keep wheel 49 from rotating and disengaging the square projection 47*a*. When inner switch mechanism 22*i* returns to the second position, rod 60 will be allowed to move down into the bottom of the integrated cam 62 and wheel 49 will rotate and release square projection 47*a*.

If turning off the switch at night, actuator 32*o* would be used to turn off the windshield wipers and actuator 32*i* would be used to turn off the parking lights and headlights. When actuator 32*o* is turned counter-clockwise, outer switch mechanism 22*o* moves square projection 47*b*, as shown in FIG. 14*c*. When outer switch mechanism 22*o* is moved to the off position, the outer switch mechanism 22*o* stops, leaving the inner switch mechanism 22*i* in its second position. When the driver wants to turn off the windshield wipers without turning off the parking lights and headlights, the driver simply turns off actuator 32*o*. Since actuator 32*o* cannot turn off the parking and headlights, the driver does not have to worry about accidentally turning off the lights. Like the first embodiment, this switch can easily be used when the driver cannot actually see the switch positions, which is important if using as a column mounted switch.

Secondly, if actuator 32*i* and inner switch mechanism 22*i* is in the second position and the windshield wipers are in any other positions except the off position, the left side of sectional notch 50L of wheel 49 will not make contact with square projection 47*a*, as shown in FIG. 14*a*. Since wheel 49 does not rotate, rod 60 will remain in the bottom of the integrated cam 62 and will not allow inner switch mechanism 22*i* to move past the second position. This allows the switch to be used in the traditional manner.

Figure 16:
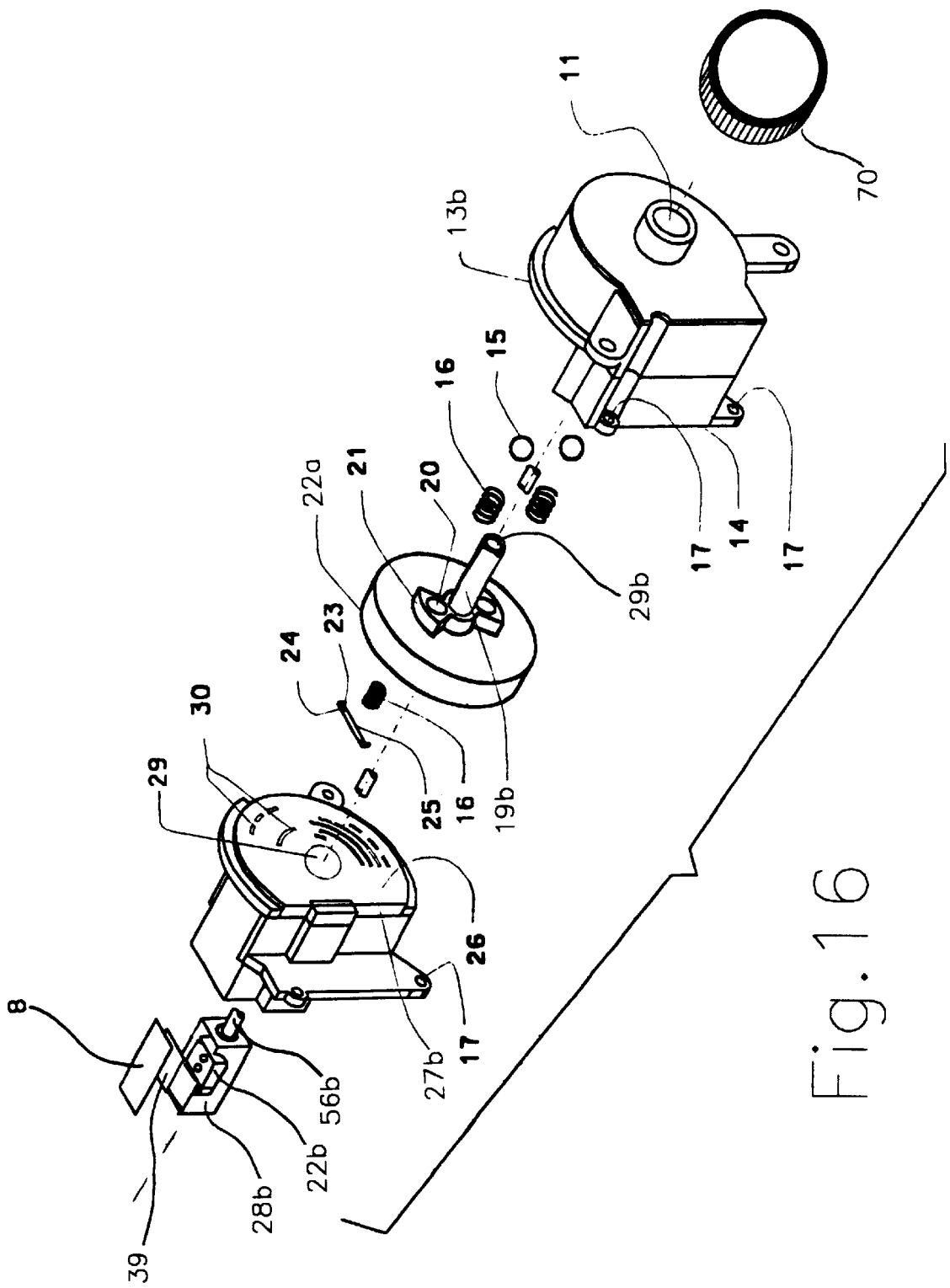
FIG. 16 is an isometric exploded view of the third embodiment of the combined headlight/wiper switch.

Referring now in detail to the third embodiment and in particular to FIGS. 16–21. The switch has a front housing 13*b* and a rear housing 27*b* that is held together by screws or rivets through holes 17, as shown in FIG. 16. The front housing 13*b* is made from metal or plastic and the rear housing 27b is made from a hard, non-conducting material. The front housing 13b has hole 11 that shaft 19b is inserted through. Shaft 19b is made of a rigid material like metal. Shaft 19b is attached to switch mechanism 22a which is made of a hard, nonconducting material. Shaft 19b and switch mechanism 22a can be made together in a single mold if desired. Shaft 19b and switch mechanism 22a has a square hole 29b drilled through the center that allows rod 56b to slide in and out. Rod 56b is made from a rigid material like metal and is square shaped like hole 29b. One end is attached to switch mechanism 22b and the other end extends through shaft 19b and is attached to actuator 70. Rod 56b moves switch mechanism 22b back and forth, and rotates switch mechanism 22a.

Figure 17:
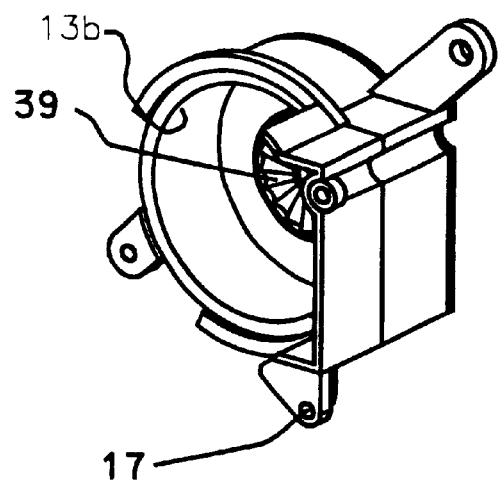
FIG. 17 is a rear view of front housing.

The inside of front housing 13b has plurality of click grooves 39 in an array around hole 11, as shown in FIG. 17. Spring 16 is inserted into blind hole 20 on the front side of switch mechanism 22a. When shaft 19b, switch mechanism 22a, spring 16 and steel ball 15 is inserted into the front housing 13b, spring 16 presses the steel ball 15 into the click grooves 39. The click grooves 39 are used to hold switch mechanism 22a in various positions, mainly the off position, the intermittent windshield wiper position, the slow windshield wiper position, and the fast windshield wiper position.

Figure 19:
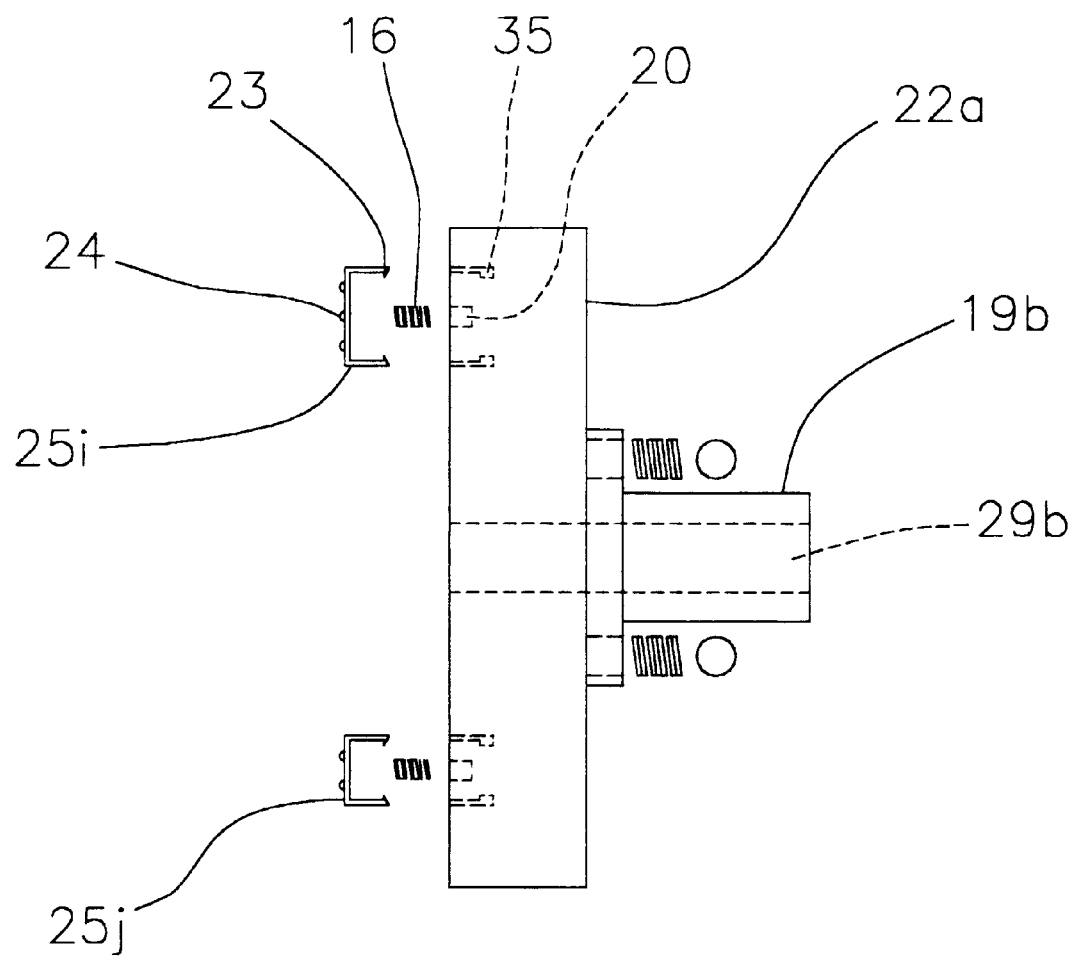
FIG. 19 is an exploded side view of switch mechanism of the third embodiment.

The back side of switch mechanism 22a has two moveable contact elements 25i and 25j, as shown in FIG. 19. The moveable contact elements are made of metal like silver or copper that act as a conductor. Contact element 25i has three nodes or rounded projections 24 and contact element 25j has two nodes. The contacts elements are wedge shaped on the inner sides 23. Each contact element has a corresponding blind hole 20, spring 16, and slots 35. Spring 16 is inserted into blind hole 20 and contact element 25 is inserted into slots 35. The wedge shaped inner sides 23 prevents the contact elements from coming out due to the force of spring 16.

When the rear housing 27b is attached to front housing 13b, spring 16 presses contact elements 25i and 25j on to the front side 26 of rear housing 27b, as shown in FIG. 16. The rear housing 27b has a front side 26 and a back side. The back side of rear housing 27b has a rectangular housing 28b that encloses the switch mechanism 22b. The rectangular housing has a cover 8 which is held in place by screws. Cover 8 would allow switch mechanism 22b to be placed in the rectangular housing 28b. The bottom of cover 8 has click grooves 39 that are used to hold switch mechanism 22b in various positions, mainly the off position, the parking lights position and the headlights position. Hole 29 is drilled through the center of front side 26 to the center of rectangular housing 28b. Rod 56b is inserted through hole 29 and is attached to switch mechanism 22b. Switch mechanism 22b has contact elements 25k and 25l on the bottom side and on the top side a blind hole 20 that holds spring 16 in place. Spring 16 press steel 15 ball against the click grooves on the bottom side of cover 8. The bottom side of the rectangular housing 28b as well as the front side 26 has fixed contact terminals or plates 30. The rear housing 27b is integrally formed with the fixed contact plates 30 and connector terminals 31 by an insert molding. The connector terminal 31 would be adapted to be coupled to a terminal connector of a vehicle wiring harness.

Figure 18:
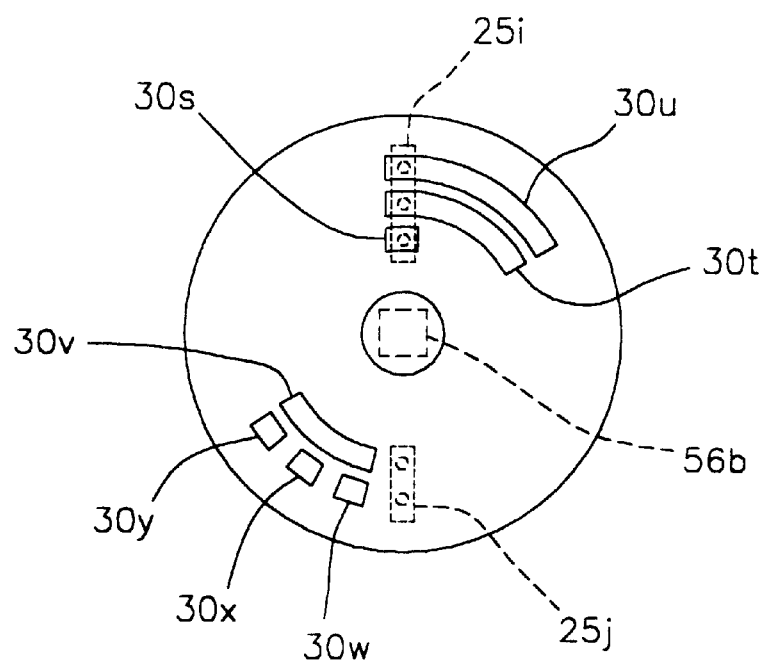
FIG. 18 is an enlarged plan view of contact plates on front side of rear housing of the third embodiment.
Figure 20A:
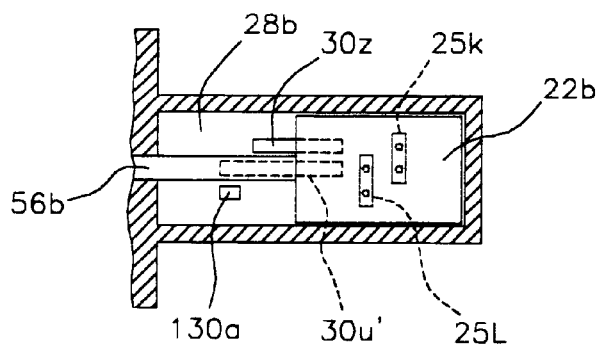
FIGS. 20a–20c is an enlarged plan view showing contact plates on bottom side of rectangular housing and the rear switch mechanism in various positions of the third embodiment.

In describing the fixed contact plates on the front side 26 and the bottom side of rectangular housing 28b, the contact plate 30s is connected to the vehicle's battery, as illustrated in FIGS. 18 and 20a. Contact plate 30t is connected to the ignition switch, contact plate 30u is connected to the center contact plate 30u' on the bottom side of rectangular housing 28b, contact plate 30v is connected to the ignition switch, contact plate 30w in connected to the intermittent windshield wiper circuit, contact plate 30x is connected to the slow windshield wiper circuit, and contact plate 30y is connected to the fast windshield wiper circuit. Contact plate 30z is connected to the parking lights circuit and contact plate 130a is connected to the headlights circuit.

The operation is as follows. When turning on the parking lights and headlights, actuator 70 is pulled out and when turning on the windshield wipers, the actuator is turned clockwise. When actuator 70 is in the off position, contact elements 25j, 25k, and 25L does not make contact with any of the contact plates, as illustrated in FIGS. 18 and 20a. However, contact element 25i does make contact with contact plates 30s, 30t, and 30u. When switch mechanism 22a is in the off position, current to the lighting circuit is supplied by the battery and through the ignition switch.

Figure 20B:
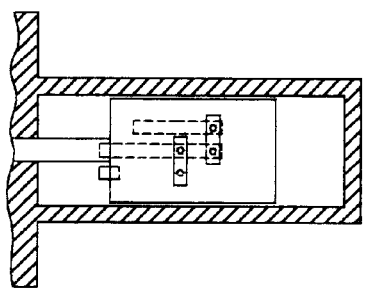

When actuator 70 is pulled and switch mechanism 22b is moved to the first position, contact element 25k makes contact with contact plate 30z and 30u', as illustrated in FIG. 20b. Contact element 25L also makes contact with contact plate 30u'. Current flows from the battery to contact plate 30s, through contact element 25i to contact plates 30u and 30u', through contact element 25k to contact plate 30z which is connected to the parking lights. Depending on the position of the ignition switch, current can also flow from the ignition switch to contact plate 30t, through contact element 25i to contact plates 30u and 30u', through contact element 25k to contact plate 30z to the parking lights.

Figure 20C:
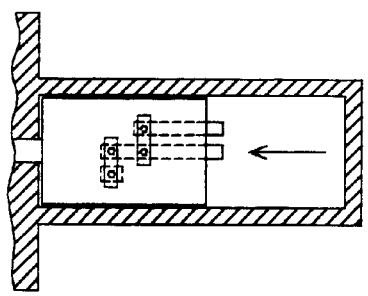

When actuator 70 is pulled to the second position, contact element 25L makes contact with contact plate 30u' and 130a, as shown in FIG. 20c. Contact element 25k continues to make contact with 30u' and 30z. Current flows from contact plate 30u', which can flow from the battery or through the ignition switch or a combination of the two, through contact element 25L to contact plate 130a which is connected to the headlights. If switch mechanism 22a is turned to any position other than the off position, current to the lighting circuits will be supplied through the ignition switch.

When actuator 70 and switch mechanism 22a are turned to the first position, contact element 25i makes contact with contact plates 30t and 30u. Contact element 25j makes contact with contact plates 30v and 30w. Current flows from the ignition switch to contact plate 30v, through contact element 25j to contact plate 30w which is connected to the intermittent windshield wiper circuit. Contact element 25j continues to make contact with contact plate 30v for the remainder of the windshield wiper positions. When actuator 70 and switch mechanism 22a are turned to the second position, contact element 25j makes contact with contact plates 30v and 30x. Current flows from the ignition switch to contact plate 30v, through contact element 25j to contact plate 30x which is connected to the slow windshield wiper circuit. When actuator 70 and switch mechanism 22a are turned to the third position, contact element 25j makes contact with contact plates 30v and 30y. Current flows from the ignition switch to contact plate 30v, through contact element 25j to contact plate 30y which is connected to the fast windshield wiper circuit.

When turning the windshield wipers off, actuator 70 is turned counter-clockwise. Hence, when the windshield wipers are on, current to the lights are supplied through the ignition switch. This way the operator knows that if the lights and windshield wipers are on, then the lights will be turned off when the ignition switch is turned off. Since current is being supplied directly from the battery and through the ignition switch, the ignition switch would supply current to the parking lights and headlights independently from the other ignition related circuits, as shown in FIG. 21. This would prevent the current from flowing to other ignition related circuits via the lighting circuit without using relays or other devices.

Conclusion

The previous inventions provides a means for conveniently turning on the parking lights and headlights when turning on the windshield wipers. Such a switch would definitely improve vehicle safety in inclement weather conditions. The switch operates the lighting and windshield wiper functions in a continuous sequence by turning on the lights first, and then turning on the various windshield wiper settings. When turning off the windshield wipers at night, it may be necessary to leave the lights on. So the switch must be able to safely turn off the windshield wipers without turning off the lights. Since the switch turns on the lights and windshield wipers in sequence, it simply turns off the windshield wipers first, then the lights. However, the operator must know where the windshield wiper function ends and where the lighting functions begins. Also the operator may not be able to look directly at the switch. This is why the prior art that turns on the lights and windshield wipers in sequence had to use two separate switches. One switch to turn on the lights and windshield wipers, and a second switch to adjust the windshield wiper's settings. What makes the switch unique is that it separates, differentiates, or isolates the lighting and windshield wiper functions by using different knob movement or by a use of a locking mechanism. The first embodiment uses a locking mechanism that stops the actuator on the first position, which is the parking lights and headlights position. The actuator can not turn until the release button is pressed. Once the release button is pressed, then the actuator can be turned to the off position. The second embodiment uses an inner actuator to turn on the lights and the windshield wipers, and an outer actuator to turn on/off the windshield wipers only. When the lights and windshield wipers are turned on using the inner actuator, the outer actuator can be used to turn off the windshield wipers while leaving the lights on. The inner actuator is then used to turn off the lights when ready. The inner actuator can also be used to turn off both the windshield wipers and the lights. The third embodiment, the actuator is pulled to turn on the lights and then is rotated to turn on the windshield wipers. When turning the windshield wiper off while leaving the lights on, the actuator is simply turned counter-clockwise.

There are many inventions that have photo and moisture sensors that turn on the lights and windshield wipers automatically. When turning on the lights and windshield wiper automatically, the cars' system and ultimately the cars' manufacturer takes the responsibility to insure that the system works. Electrical systems that rely on many components such as relays and photo sensors to work, can fail if one of the components malfunctions or was not manufactured properly. Since the lighting system is very important, if it were to fail or had inherent problems and needed to be recalled, the liability to the manufacturer could be great. The switches described previously, are controlled by the driver. Since most windshield wipers are mechanically operated, the driver manually turns on and controls the various windshield wiper settings. So by adding a light position or positions before the wiper positions, gives the opportunity for the lights to be manually or mechanically turned on as well. Relays or other electrical components simply would not be needed and the integrity of the lighting system would not be compromised. The switches are easy and convenient to use, but it is the operator that controls the lighting and windshield wiper systems.

The switches can also operate the lights and windshield wipers independently of each other if so desired. The first embodiment has a push button that disables the locking mechanism and the lighting circuit to the switch. Therefore, the switch operates as a regular wiper switch. In the second and third embodiments, the wiper actuator is simply turned on.

It is common practice to have current to the lights supplied from the battery and current to the wipers supplied through the ignition switch. But it would be a desirable feature to have the lights on the ignition switch circuit when the windshield wipers are on. The first embodiment, the switch can be used in conjunction with a standard light switch. The standard light switch would have current supplied from the battery and the combined headlight/wiper switch would have current supplied through the ignition switch. For the second embodiment, when the inner actuator is turned to the first and second positions, the parking lights and headlights are turned on. And current is supplied from the battery. When the inner actuator is turned to the third, fourth, and fifth positions, current is supplied through the ignition switch. The third embodiment, when the actuator is pulled, the lights are turned on and current is supplied from the battery. When the actuator is rotated to turn on the windshield wipers, current is supplied to the lights through the ignition switch. Since current to the lighting circuit is supplied from the battery and through the ignition switch, the ignition switch simply supplies current to the parking lights and headlights on a separate circuit from the rest of the ignition circuits.

Although the description above contains many specificities, these should not be construed as limiting the scope of the invention but as merely providing illustrations of some of the presently preferred embodiments of this invention. For example, the lights can be comprised of the lights that are normally turned on by the parking light and headlight switch; or in any combination thereof. The circuit diagram would have common parts such as fuses, light dimmers, headlight high/low beam changer, wash/wipe switch, mist switch, etc. The first embodiment could have stronger click grooves between the lighting, windshield wiper, and off positions; or the actuator could be pulled or pushed in order to turn the switch off. The second embodiment could have the lights turned on in the first position followed by the various windshield wiper settings. The third embodiment could have an outer actuator to adjust the brightness of the interior lights. Instead of having a actuator to pull and turn, a lever could be used which moves up and down for the adjusting the wiper settings and be moves in and out for tuning the lights on/off.

Thus the scope of the invention should be determined by the appended claims and their legal equivalents, rather than by the examples given.

I claim:

1. In a vehicle having a lighting system, a windshield wiper system, and an electrical supply source, a combined light and windshield wiper control switch comprising of:
   a) actuating means for coupling said electrical supply source to said lighting system and to said windshield wiper control system, in a continuous sequence,
   b) said windshield wiper control system having at least two wiper settings,
   whereby said switch will conveniently activate said lighting system followed by the various windshield wiper settings.

2. The switch of claim 1 wherein comprising of actuating means for coupling said electrical supply source to said lighting system and to at least two windshield wiper settings, in a predetermined number of positions.

3. The switch of claim 1 wherein comprising of actuating means for coupling said electrical supply source to the parking light means and to the headlight means in the first position, coupling said electrical supply source to the intermittent windshield wiper means in the second position, coupling said electrical supply source to the slow windshield wiper means in the third position, and coupling said electrical supply source to the fast windshield wiper means in the fourth position.

4. The switch of claim 1 wherein comprising of actuating means for coupling said electrical supply source to said parking light means and to said headlight means in the first position, coupling said electrical supply source to said intermittent windshield wiper means in a predetermined number of positions, and coupling said electrical supply source to said slow windshield wiper means and to said fast windshield wiper means in the last two positions, respectively.

5. The switch of claim 1 wherein comprising of actuating means for coupling said electrical supply source to said parking light means in the first position, coupling said electrical supply source to said headlight means in the second position, coupling said electrical supply source to said intermittent windshield wiper means in a predetermined number of positions, and coupling said electrical supply source to said slow windshield wiper means and to said fast windshield wiper means in the last two positions, respectively.

6. In a vehicle having a lighting system, a windshield wiper system, and an electrical supply source, a combined light and windshield wiper control switch comprising of:

a) actuating means for coupling said electrical supply source to said lighting system and to said windshield wiper control system, in a continuous sequence, b) said windshield wiper control system having at least two wiper settings, c) isolating-position means for preventing a predetermined number of positions from being reached when said switch is being turned off, whereby when turning off said switch, the windshield wipers can be turned off while leaving the lights on.

7. The switch of claim 6 wherein comprising of stopping means for stopping the actuator means on the light position when turning said switch off.

8. The switch of claim 7 wherein comprising of releasing means to allow said actuator means to be turned to the off position.

9. The switch of claim 7 wherein comprising of means to enable and disable said stopping means.

10. The switch of claim 6 wherein comprising of first actuator means for initiating the activation of said lighting system and said windshield wiper system, and a second actuator means for initiating the activation of said windshield wiper system.

11. The switch of claim 10 wherein said first actuator means has engaging means to interlock said first actuator to said second actuator at a predetermined position.

12. The switch of claim 6 wherein actuator means comprising of rotating and linear movement for initiating the activation of said lighting system and said windshield wiper system.

13. The switch of claim 12 wherein said actuator means is pulled to the first position to initiate the activation of the parking lights means, pulled to the second position to initiate the activation of the headlights means, turned to the first position to initiate the activation of the intermittent windshield wiper means, turned to the second position to initiate the activation of the slow windshield wiper means, and turned to the third position to initiate the activation of the fast windshield wiper means.

* * * * *